(12) United States Patent
Gray et al.

(10) Patent No.: US 11,281,532 B1
(45) Date of Patent: *Mar. 22, 2022

(54) SYNCHRONOUSLY STORING DATA IN A DISPERSED STORAGE NETWORK

(71) Applicant: Pure Storage, Inc., Mountain View, CA (US)

(72) Inventors: Adam M. Gray, Chicago, IL (US); Greg R. Dhuse, Chicago, IL (US); Andrew D. Baptist, Mt. Pleasant, WI (US); Ravi V. Khadiwala, Bartlett, IL (US); Wesley B. Leggette, Chicago, IL (US); Scott M. Horan, Clarendon Hills, IL (US); Franco V. Borich, Naperville, IL (US); Bart R. Cilfone, Marina del Rey, CA (US); Daniel J. Scholl, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/535,732

(22) Filed: Aug. 8, 2019

Related U.S. Application Data

(63) Continuation of application No. 15/661,332, filed on Jul. 27, 2017, now Pat. No. 10,387,252, which is a
(Continued)

(51) Int. Cl.
*G06F 12/00* (2006.01)
*G06F 11/10* (2006.01)
(Continued)

(52) U.S. Cl.
CPC .......... *G06F 11/1076* (2013.01); *G06F 3/064* (2013.01); *G06F 3/067* (2013.01);
(Continued)

(58) Field of Classification Search
CPC .. G06F 11/1076; G06F 11/1092; G06F 16/10; G06F 11/20; G06F 3/0659;
(Continued)

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Mark A Giardino, Jr.
(74) *Attorney, Agent, or Firm* — Garlick & Markison; Timothy W. Markison; Kelly H. Hale

(57) ABSTRACT

A method begins with a processing module obtaining a data object from a user and identifying a plurality of virtual storage vaults (VSVs) for storage of the data object. The method continues with the processing module determining dispersal error encoding parameters associated with a first virtual storage vault and error encoding the data object in accordance with those dispersal error encoding parameters to produce a corresponding plurality of sets of encoded data slices (EDSs), issuing write slice requests for the EDSs and receiving EDS information from at least some of the plurality of VSVs. When the EDS information indicates that a threshold number of VSVs have successfully stored the plurality of sets of encoded data slices within a synchronization timeframe, the method continues with the processing module issuing a favorable response to the user, or when a threshold number of VSVs have not successfully stored the plurality of sets of encoded data slices initiating a retry process.

20 Claims, 25 Drawing Sheets

Related U.S. Application Data continuation-in-part of application No. 14/927,446, filed on Oct. 29, 2015, now Pat. No. 9,727,427.

(60) Provisional application No. 62/098,449, filed on Dec. 31, 2014.

(51) Int. Cl.

| | |
|---|---|
| *H04L 67/1097* | (2022.01) |
| *H04L 12/46* | (2006.01) |
| *G06F 16/10* | (2019.01) |
| *G06F 11/20* | (2006.01) |
| *G06F 3/06* | (2006.01) |
| *G06F 13/00* | (2006.01) |
| *G06F 13/28* | (2006.01) |

(52) U.S. Cl.
CPC .......... *G06F 3/0619* (2013.01); *G06F 3/0659* (2013.01); *G06F 11/1092* (2013.01); *G06F 11/20* (2013.01); *G06F 16/10* (2019.01); *H04L 12/4625* (2013.01); *H04L 67/1097* (2013.01); *G06F 2211/1028* (2013.01)

(58) Field of Classification Search
CPC ........ G06F 3/0619; G06F 3/067; G06F 3/064; G06F 2211/1028; H04L 67/1097; H04L 12/4625

See application file for complete search history.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,341,626 | B1 | 12/2012 | Gardner et al. |
| 8,832,683 | B2 | 9/2014 | Heim |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0029731 | A1 | 2/2011 | Ciltone et al. |
| 2012/0137091 | A1 | 5/2012 | Grube et al. |
| 2014/0195875 | A1 | 7/2014 | Resch et al. |
| 2014/0223435 | A1 | 8/2014 | Chang |
| 2015/0074351 | A1 | 3/2015 | Avati et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

(56) References Cited

OTHER PUBLICATIONS

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

distributed computing system 10

SYNCHRONOUSLY STORING DATA IN A DISPERSED STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 15/661,332, entitled "SYNCHRONOUSLY STORING DATA IN A PLURALITY OF DISPERSED STORAGE NETWORKS", filed Jul. 27, 2017, scheduled to issue as U.S. patent Ser. No. 10/387,252 on Aug. 20, 2019, which claims priority as a continuation-in-part of U.S. Utility application Ser. No. 14/927,446, entitled "SYNCHRONIZING STORAGE OF DATA COPIES IN A DISPERSED STORAGE NETWORK", filed Oct. 29, 2015, issued as U.S. Pat. No. 9,727,427 on Aug. 8, 2017, which claims priority pursuant to 35 U.S.C. § 119(e) to U.S. Provisional Application No. 62/098,449, entitled "SYNCHRONOUSLY STORING DATA IN A PLURALITY OF DISPERSED STORAGE NETWORKS," filed Dec. 31, 2014, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

Figure 9A:
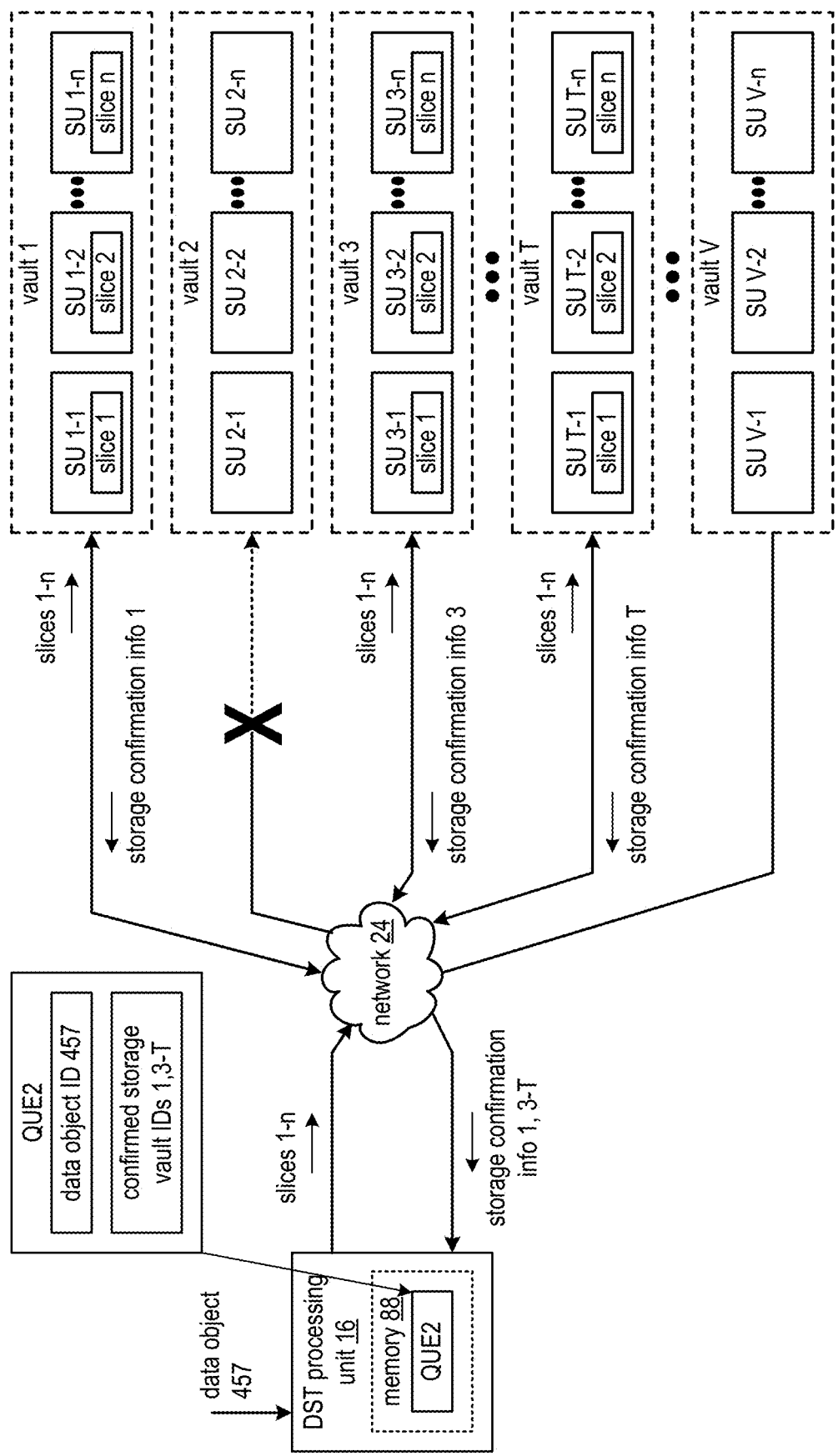
Figure 9B:
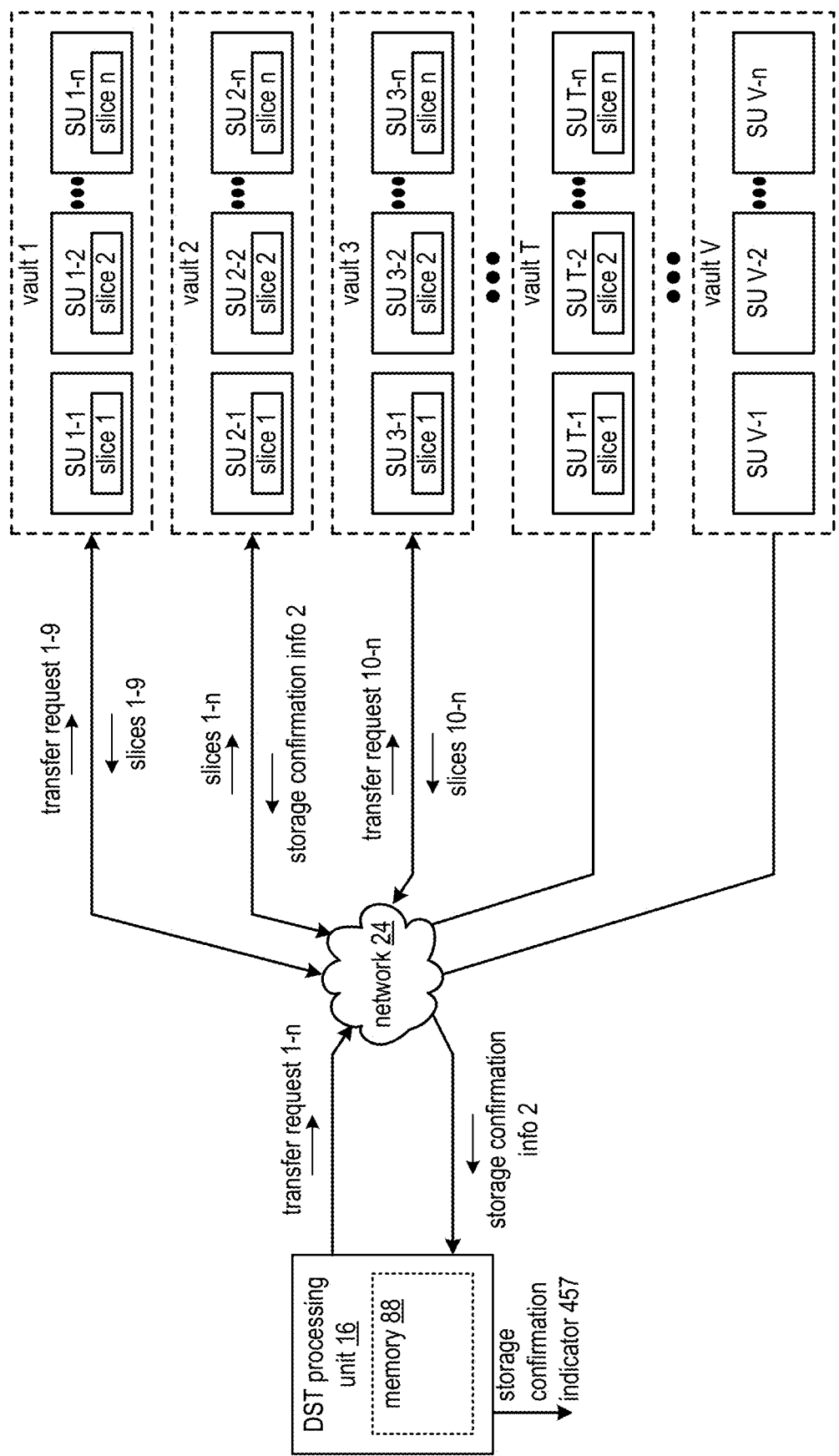
Figure 9C:
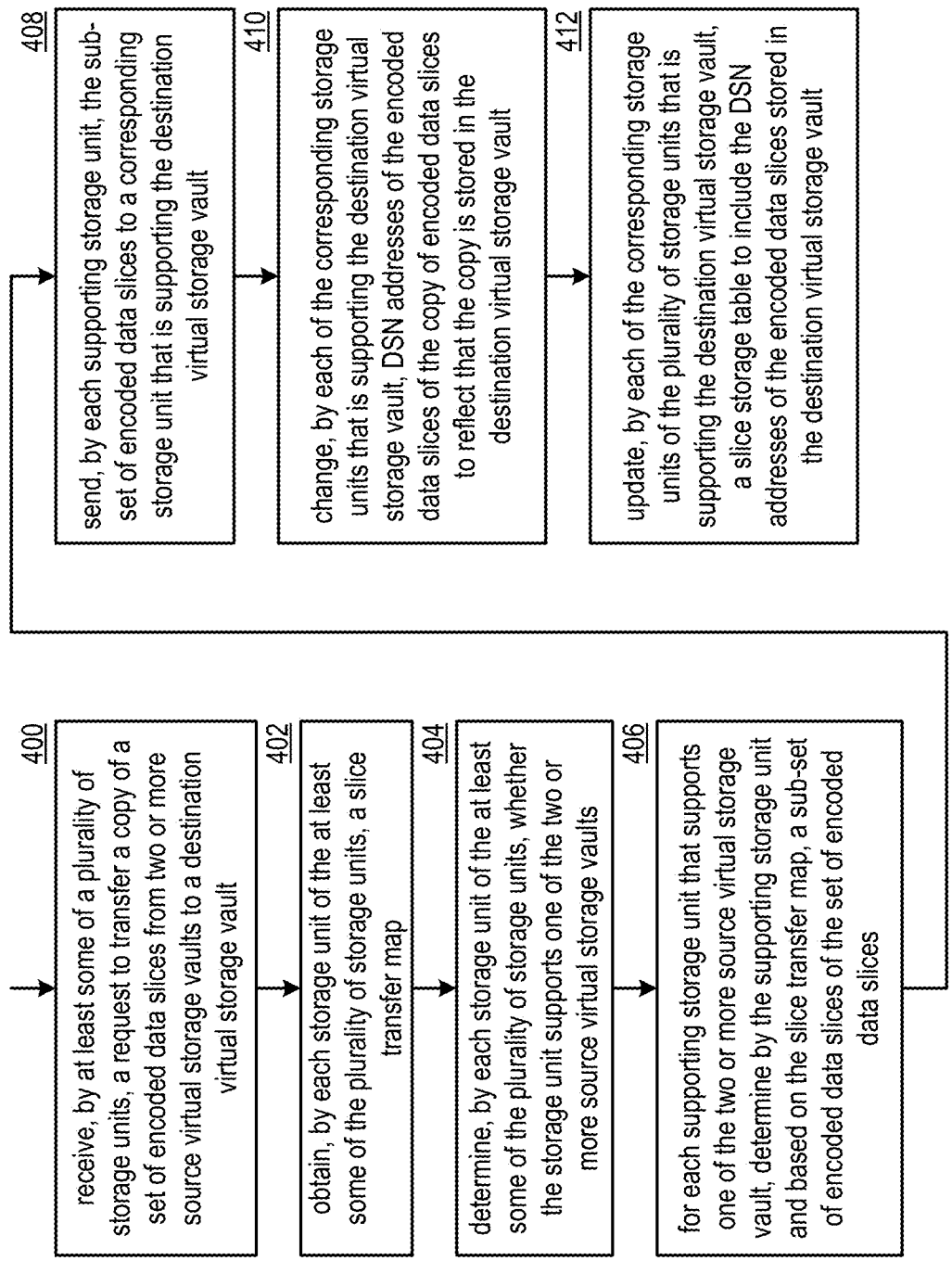
Figure 10A:
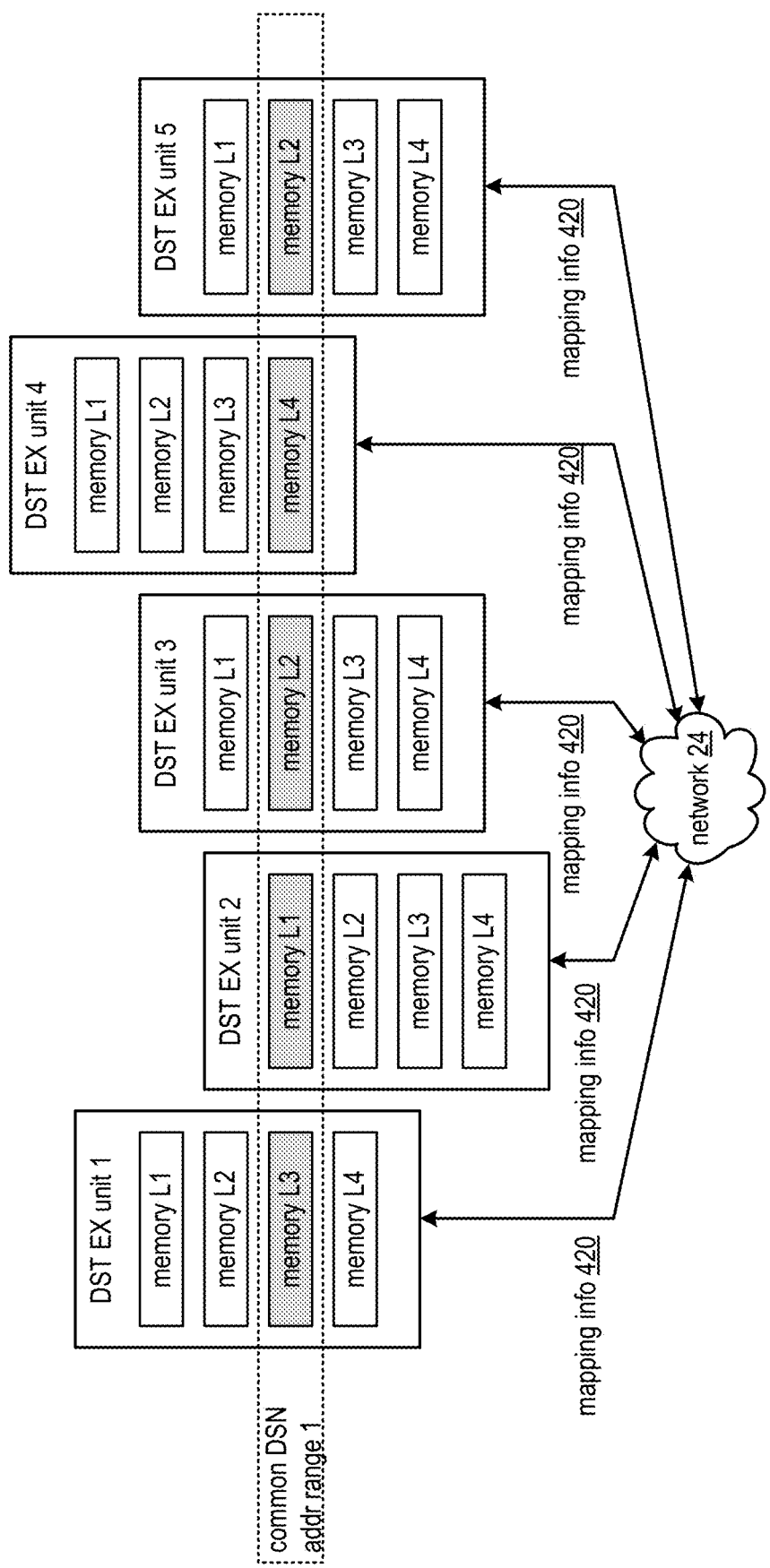
Figure 10B:
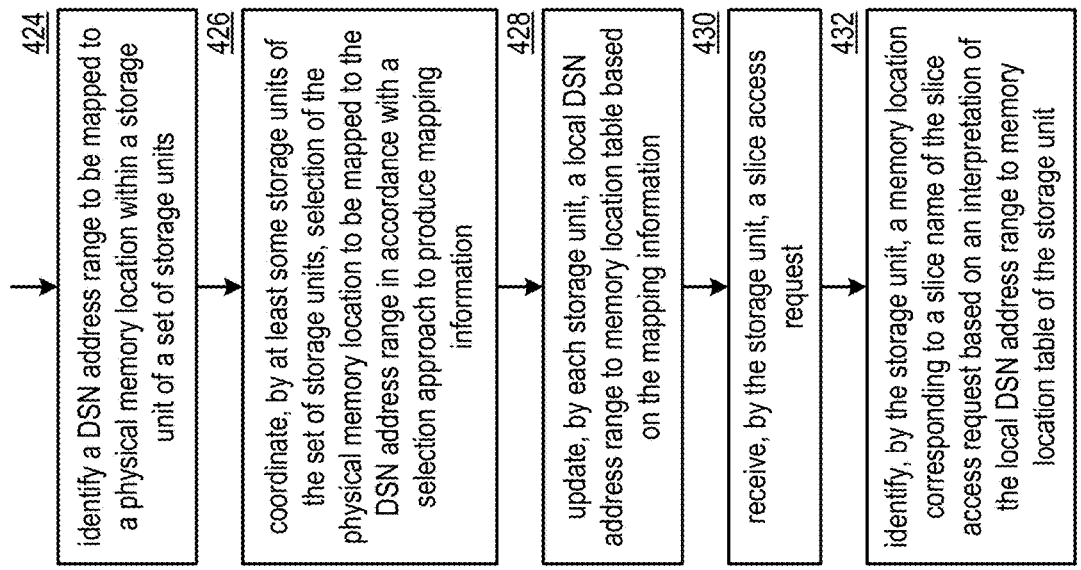
Figure 11A:
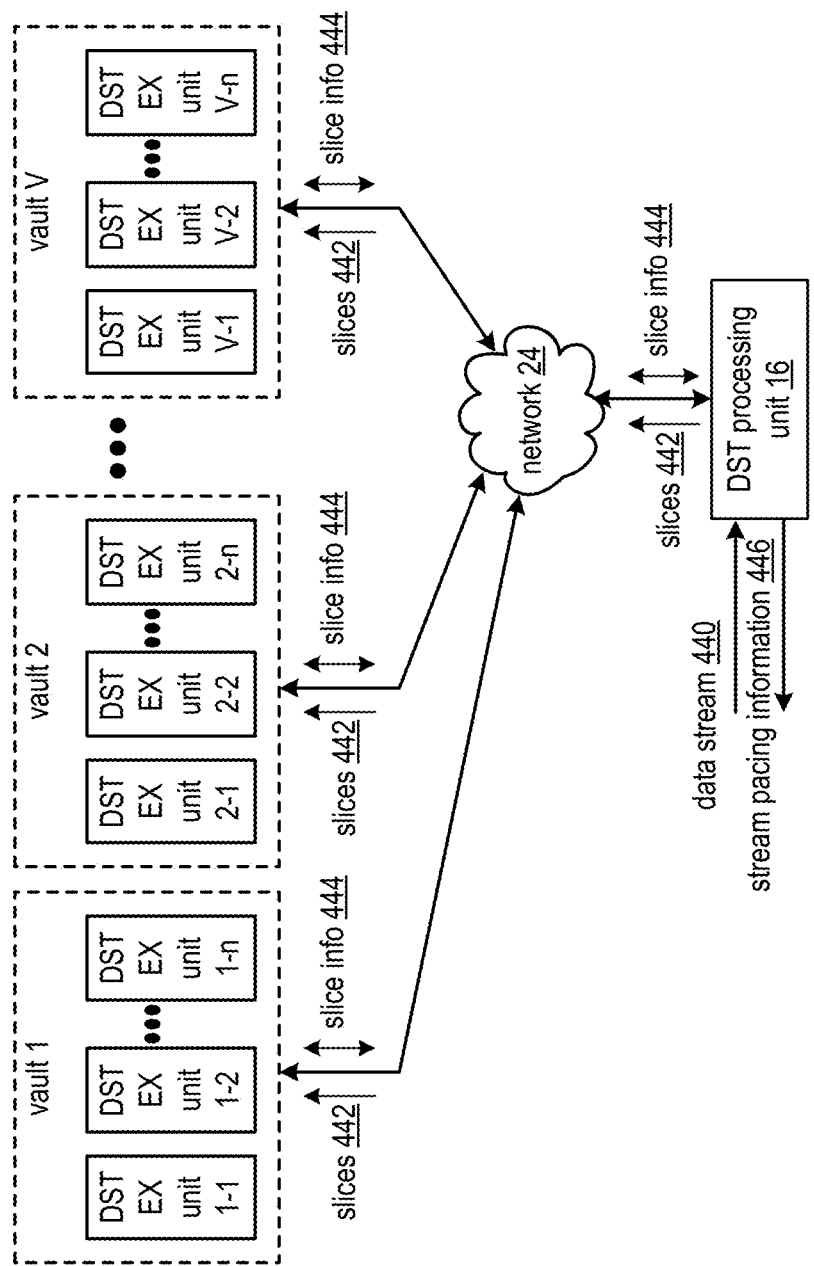
Figure 11B:
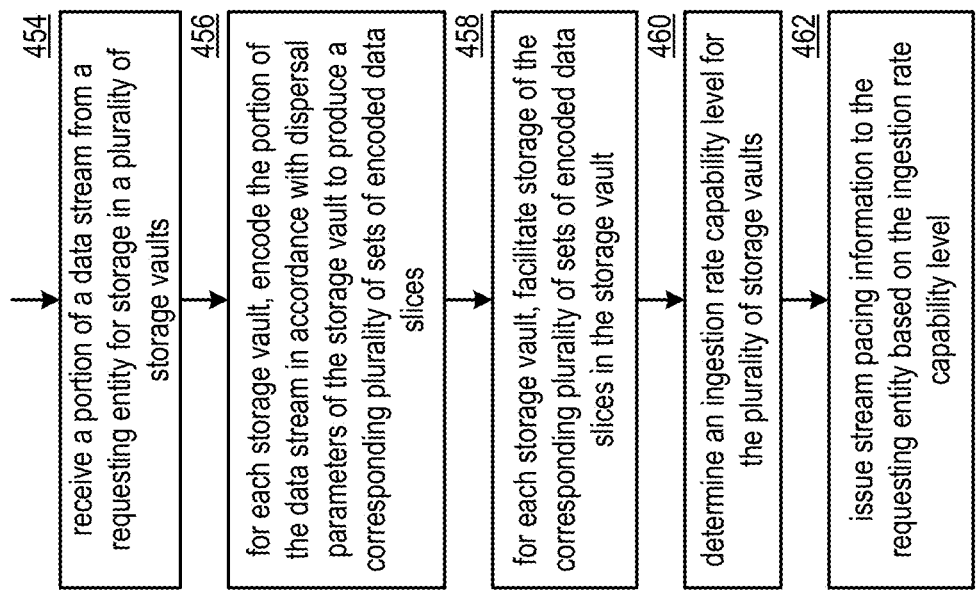
Figure 12A:
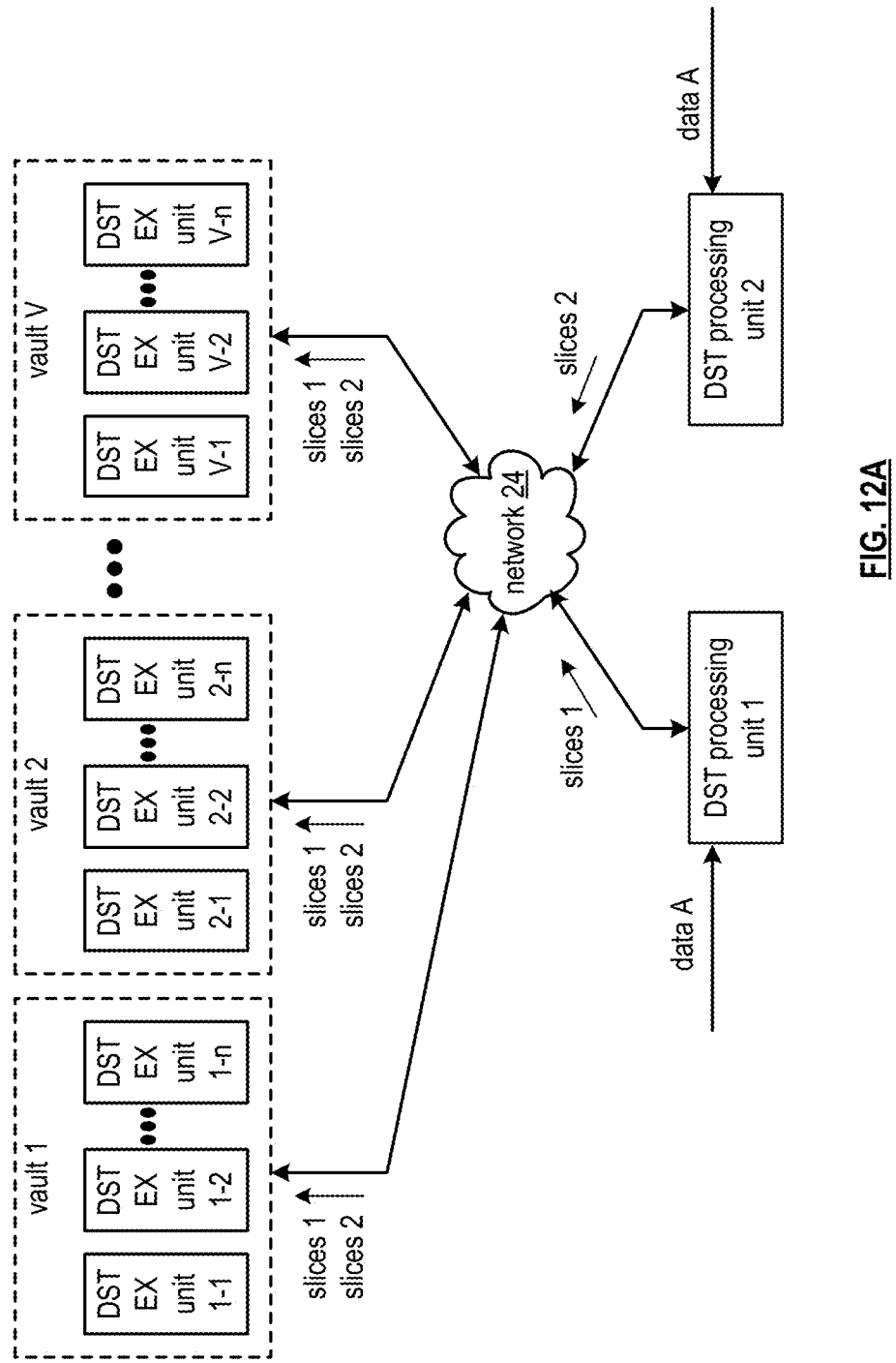
Figure 12B:
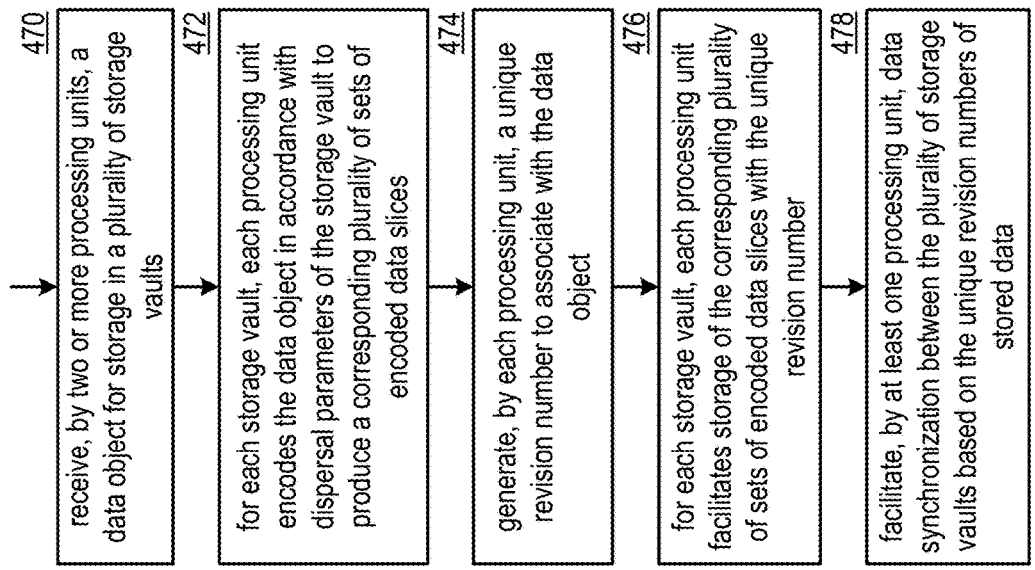
Figure 13A:
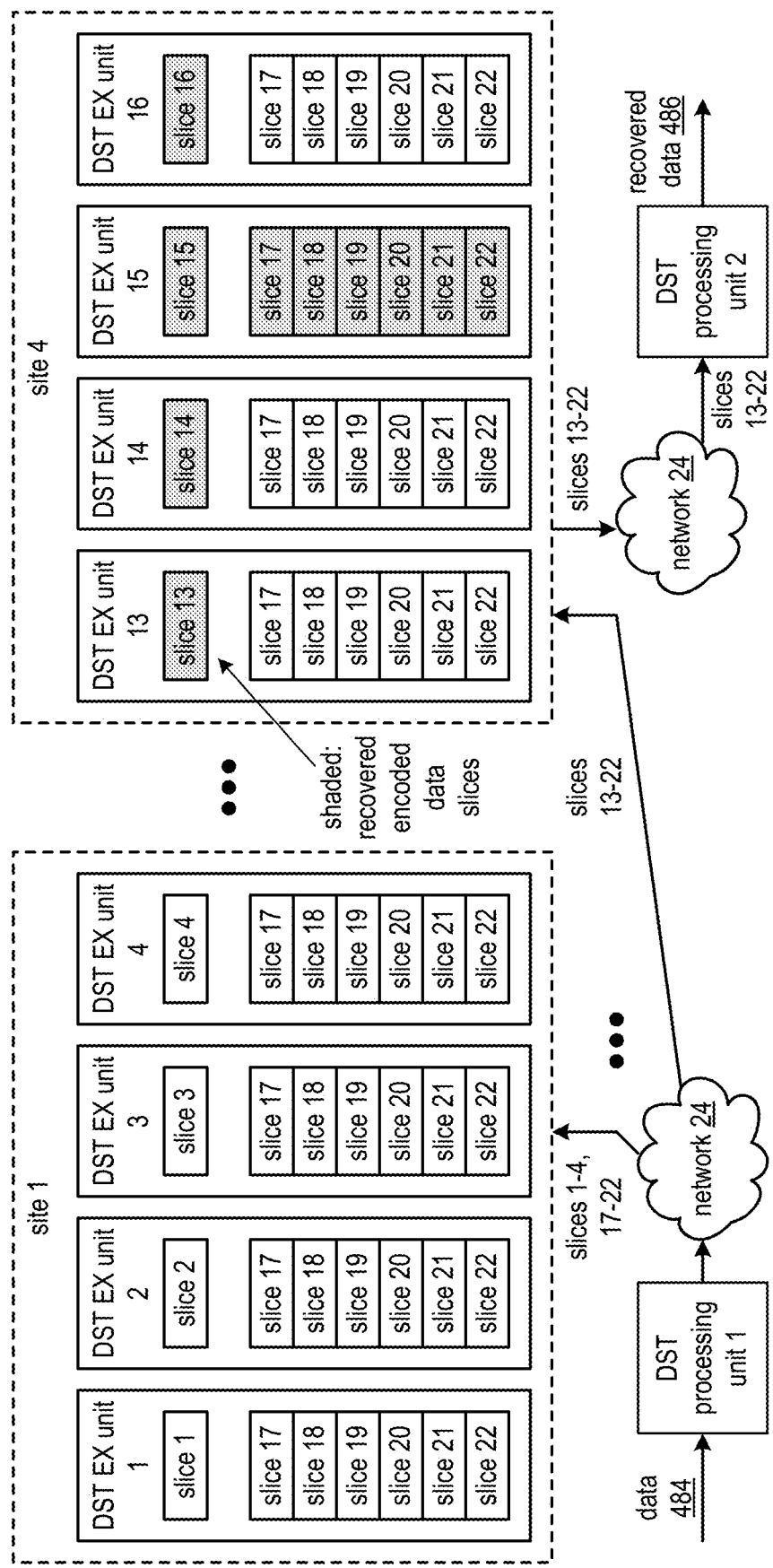
Figure 13B:
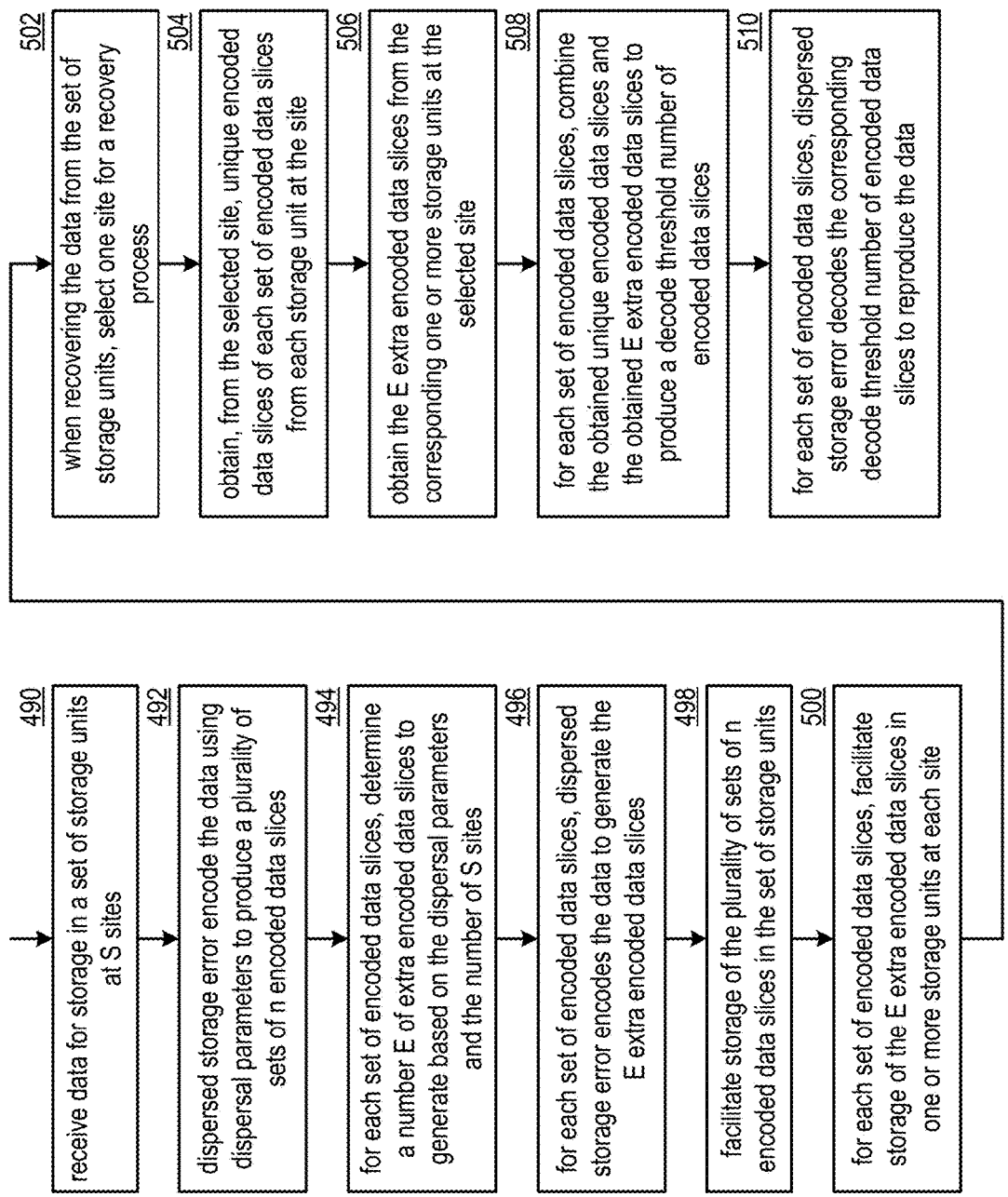
Figure 14A:
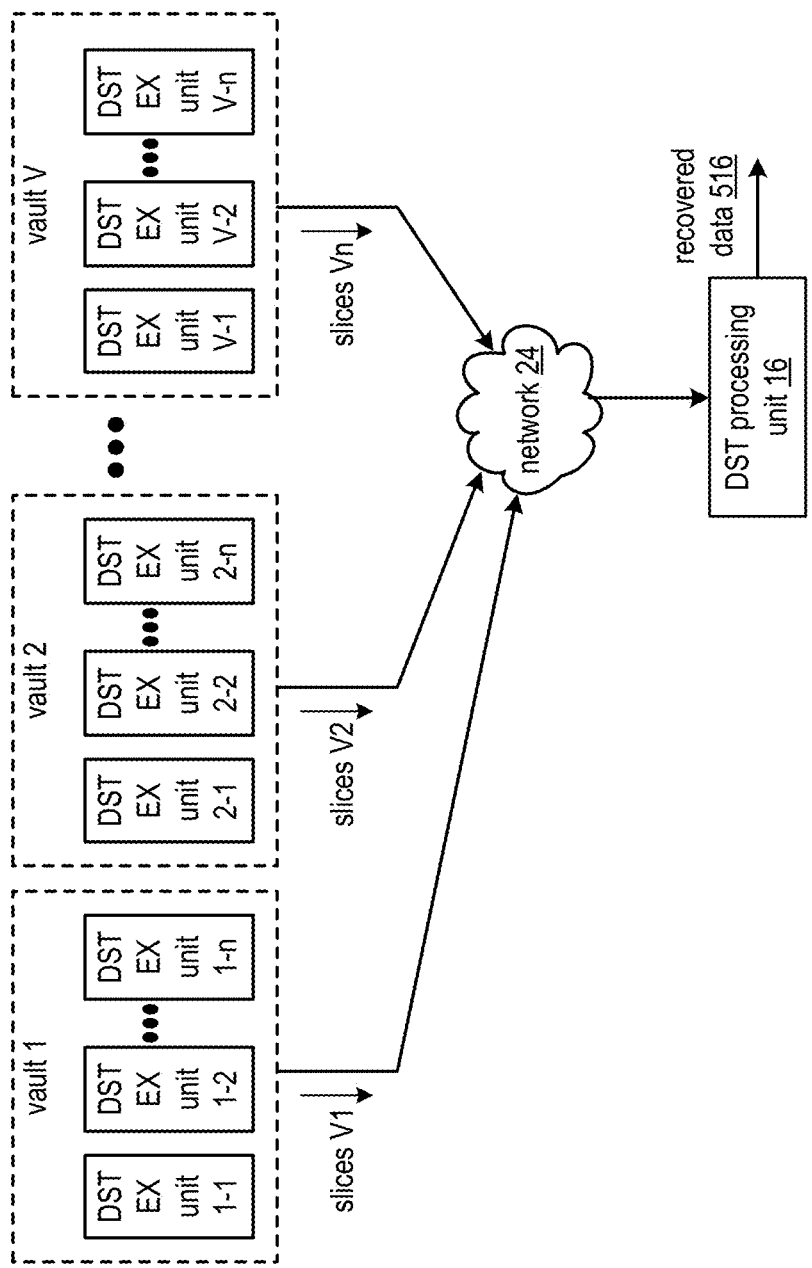
Figure 14B:
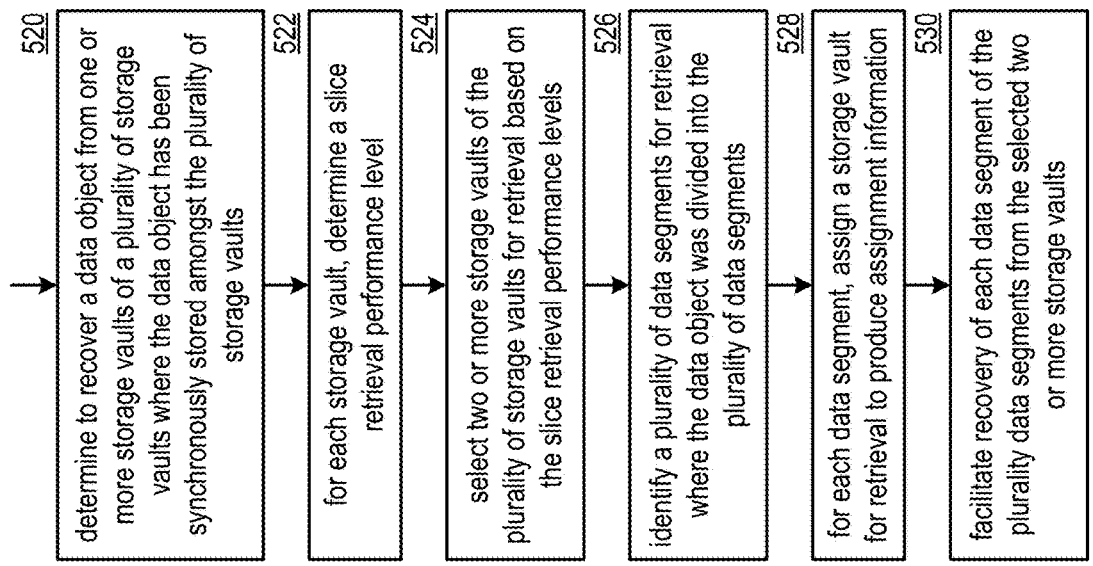
Figure 15A:
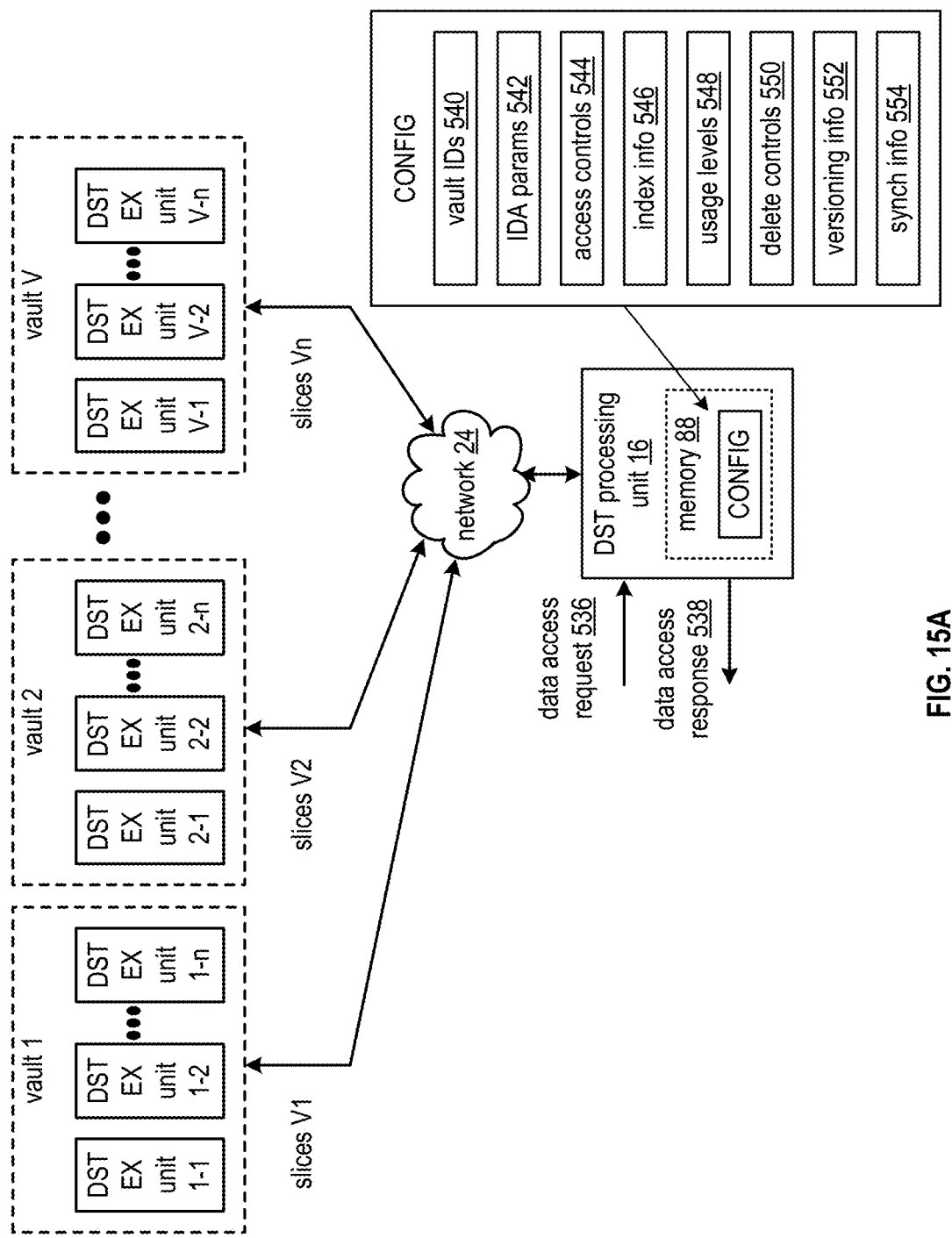
Figure 15B:
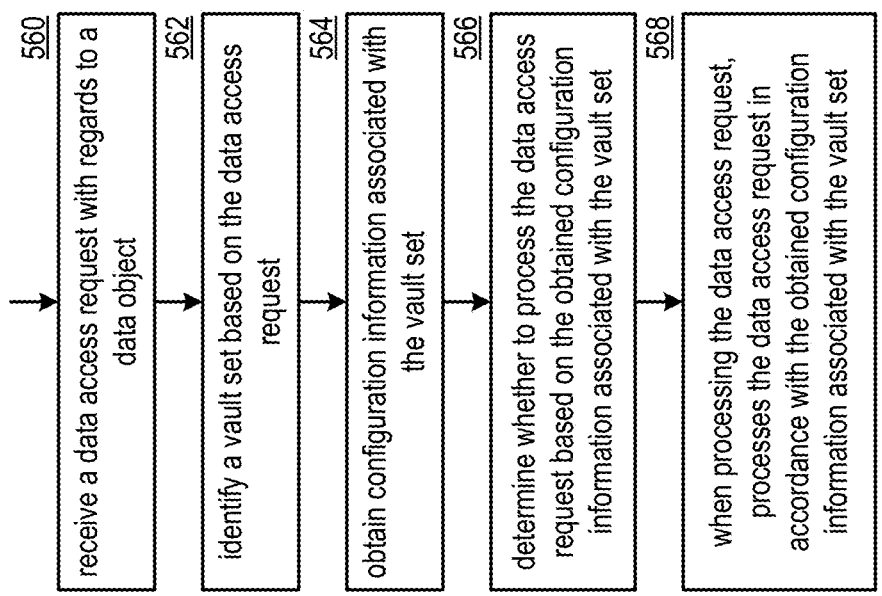

FIGS. 9A-B are schematic block diagrams of another dispersed storage network in accordance with the present invention;

FIG. 9C is a flowchart illustrating another example of synchronizing storage of data copies in accordance with the present invention;

FIG. 10A is a schematic block diagram of another dispersed storage network in accordance with the present invention;

FIG. 10B is a flowchart illustrating an example of associating virtual addressing with physical storage in accordance with the present invention;

FIG. 11A is a schematic block diagram of another dispersed storage network in accordance with the present invention;

FIG. 11B is a flowchart illustrating an example of pacing ingestion of data into a plurality of storage vaults in accordance with the present invention;

FIG. 12A is a schematic block diagram of another dispersed storage network in accordance with the present invention;

FIG. 12B is a flowchart illustrating an example of synchronously storing similar data in accordance with the present invention;

FIG. 13A is a schematic block diagram of another dispersed storage network in accordance with the present invention;

FIG. 13B is a flowchart illustrating an example of accessing data in accordance with the present invention;

FIG. 14A is a schematic block diagram of another dispersed storage network in accordance with the present invention;

FIG. 14B is a flowchart illustrating an example of recovering stored data in accordance with the present invention;

FIG. 15A is a schematic block diagram of another dispersed storage network in accordance with the present invention; and FIG. 15B is a flowchart illustrating an example of processing data access requests in accordance with the present invention.

DETAILED DESCRIPTION OF THE INVENTION

Figure 1:
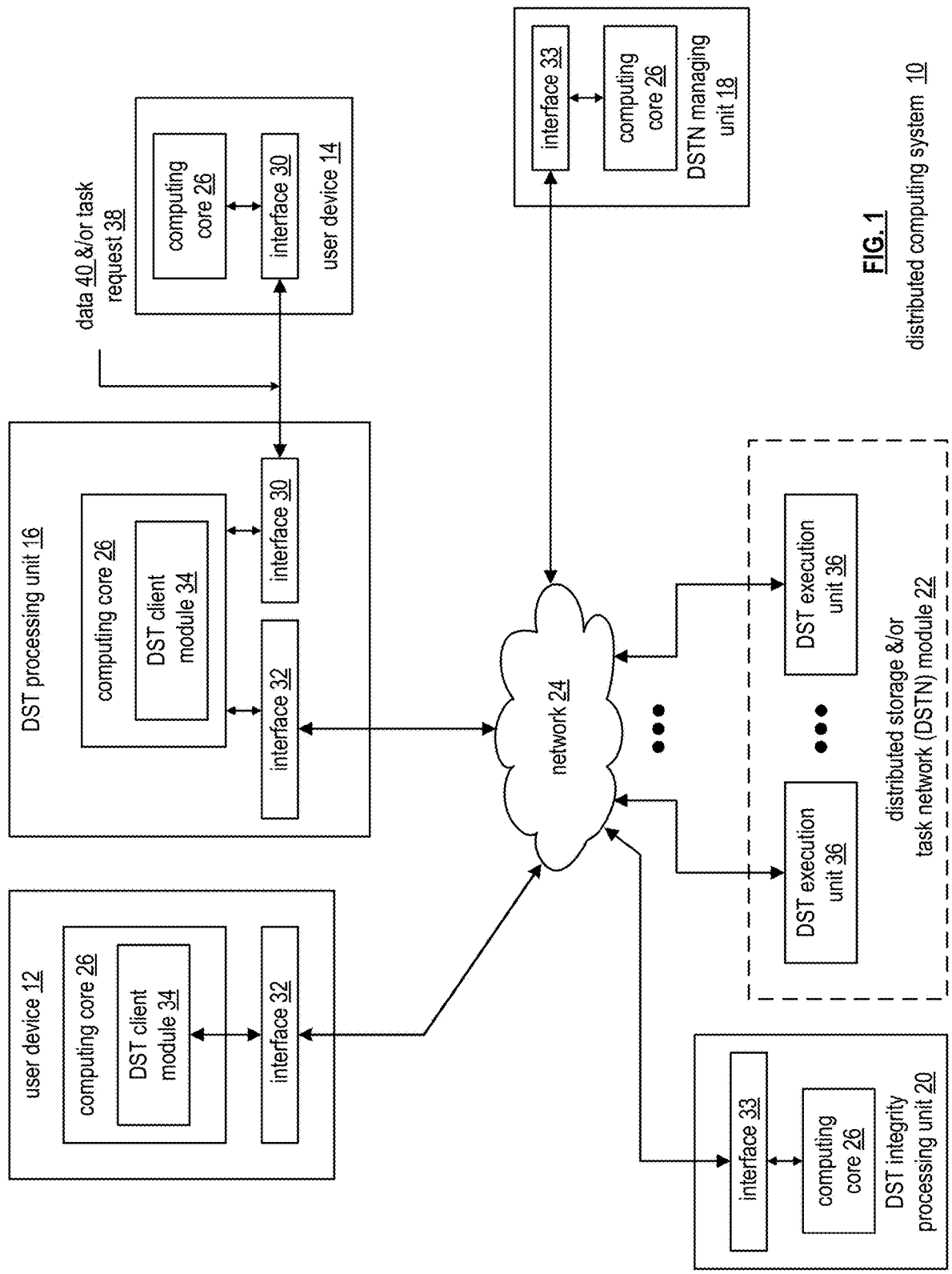
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval (an example of which will be discussed with reference to FIGS. 23-24), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-4). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

Figure 2:
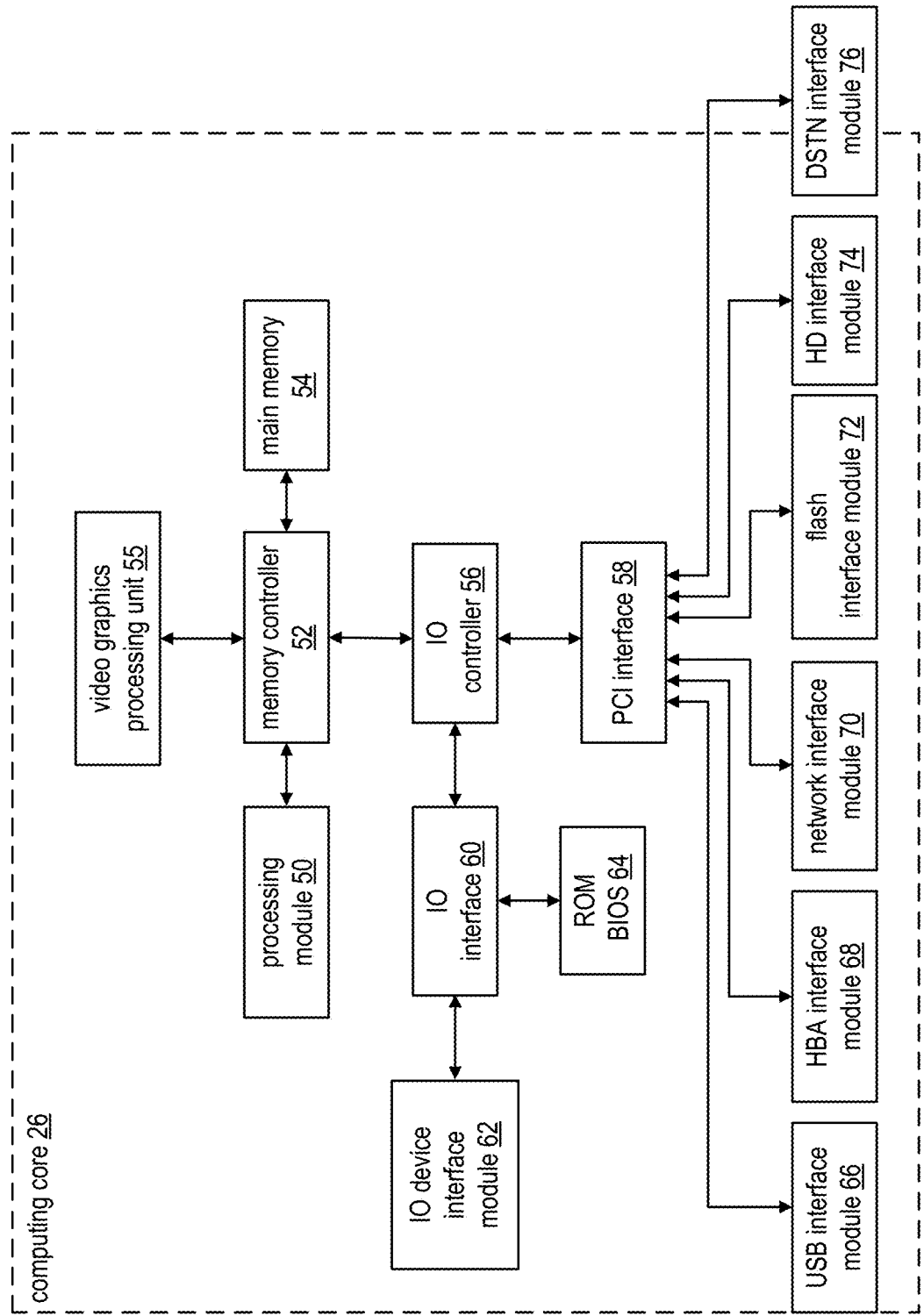
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
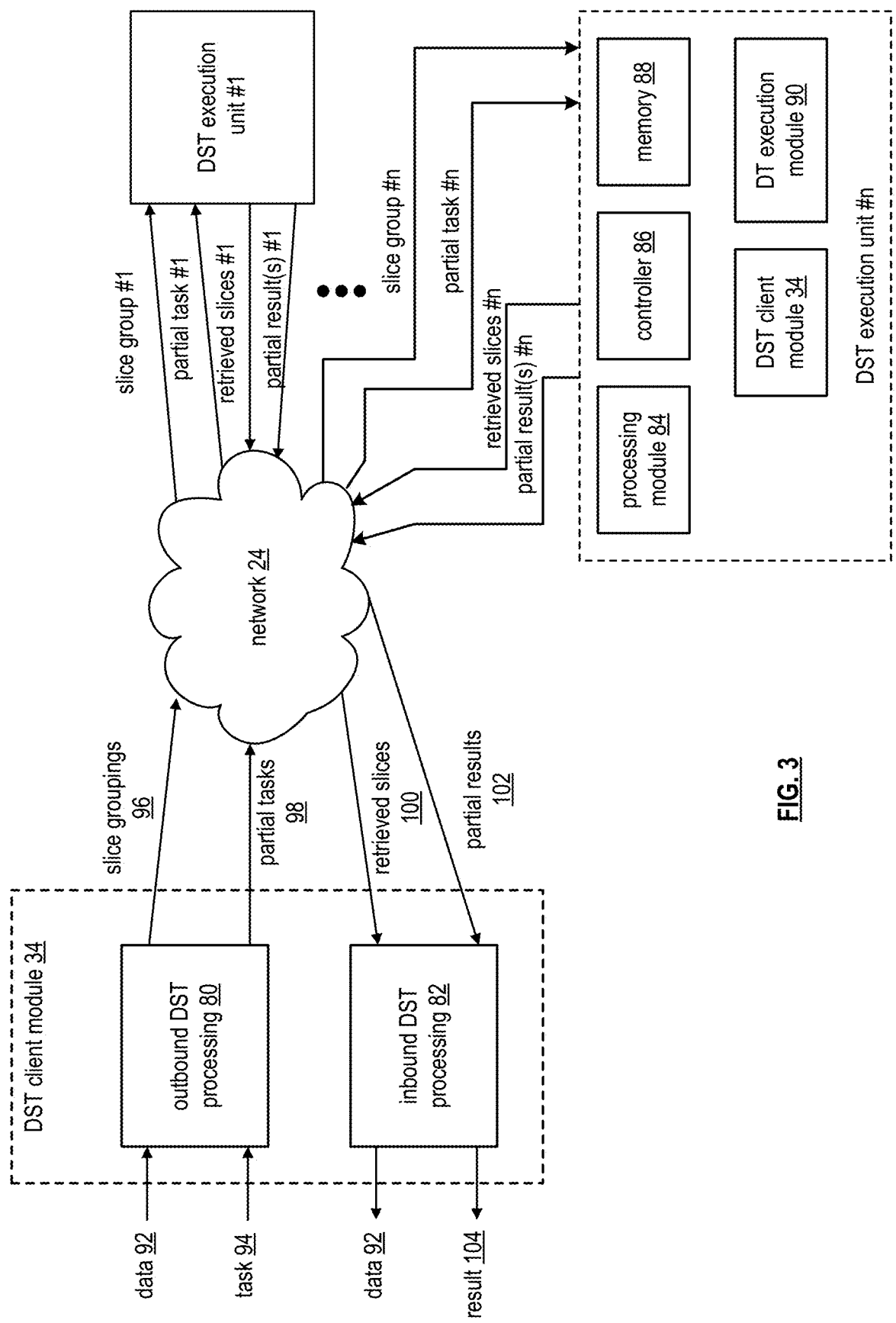
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
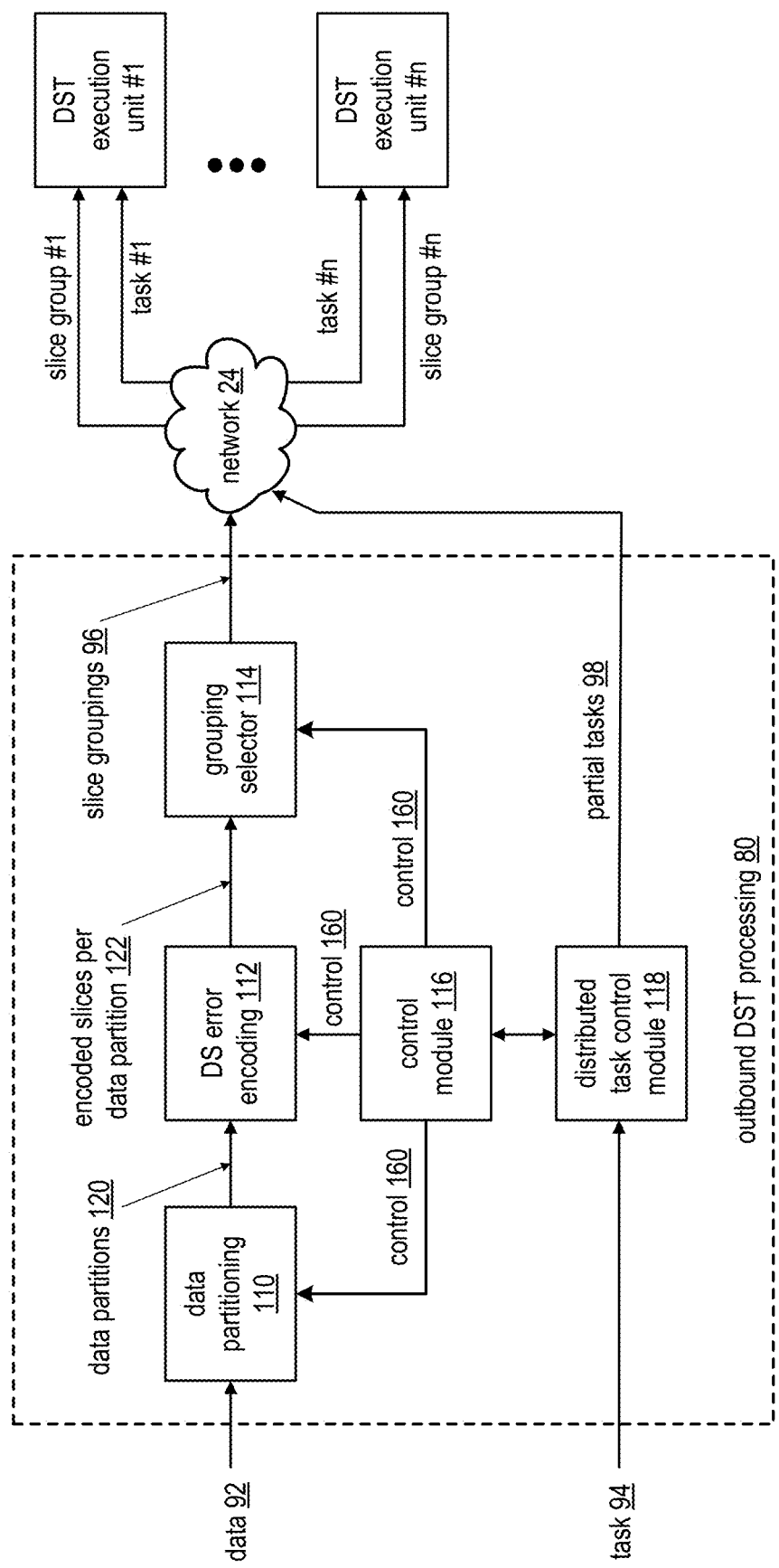
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phase and a second set of partial tasks for finding and counting the second phrase. The distributed task control module 118 sends respective first and/or second partial tasks 98 to each DST execution unit 36.

Figure 5:
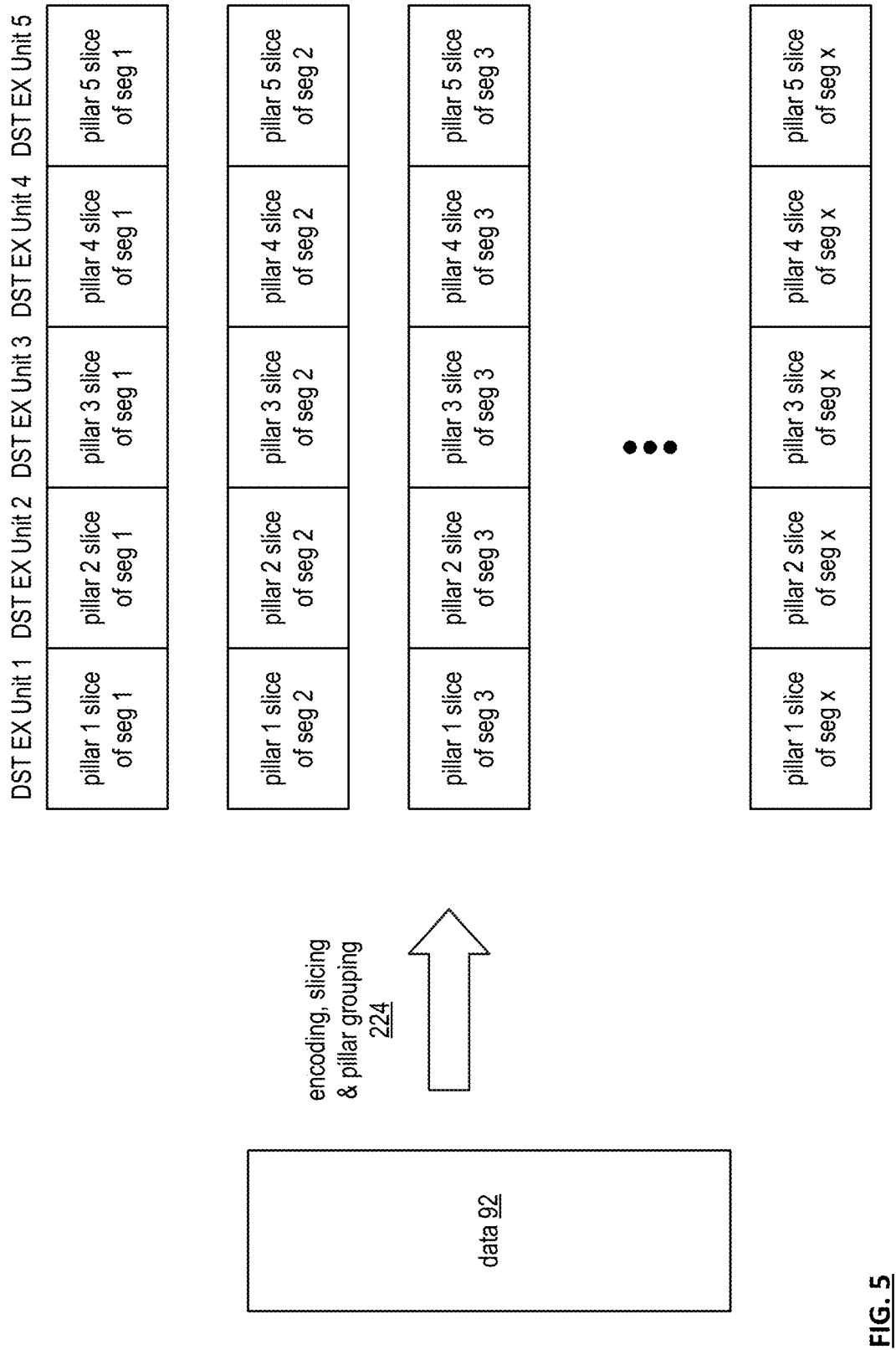
FIG. 5 is a diagram of an example of converting data into pillar slice groups for storage in accordance with the present invention.

FIG. 5 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selection module organizes the sets of encoded data slices into pillars of data slices. In this example, the DS error encoding parameters include a pillar width of 5 and a decode threshold of 3. As such, for each data segment, 5 encoded data slices are created.

The grouping selection module takes the first encoded data slice of each of the sets and forms a first pillar, which may be sent to the first DST execution unit. Similarly, the grouping selection module creates the second pillar from the second slices of the sets; the third pillar from the third slices of the sets; the fourth pillar from the fourth slices of the sets; and the fifth pillar from the fifth slices of the set.

Figure 6:
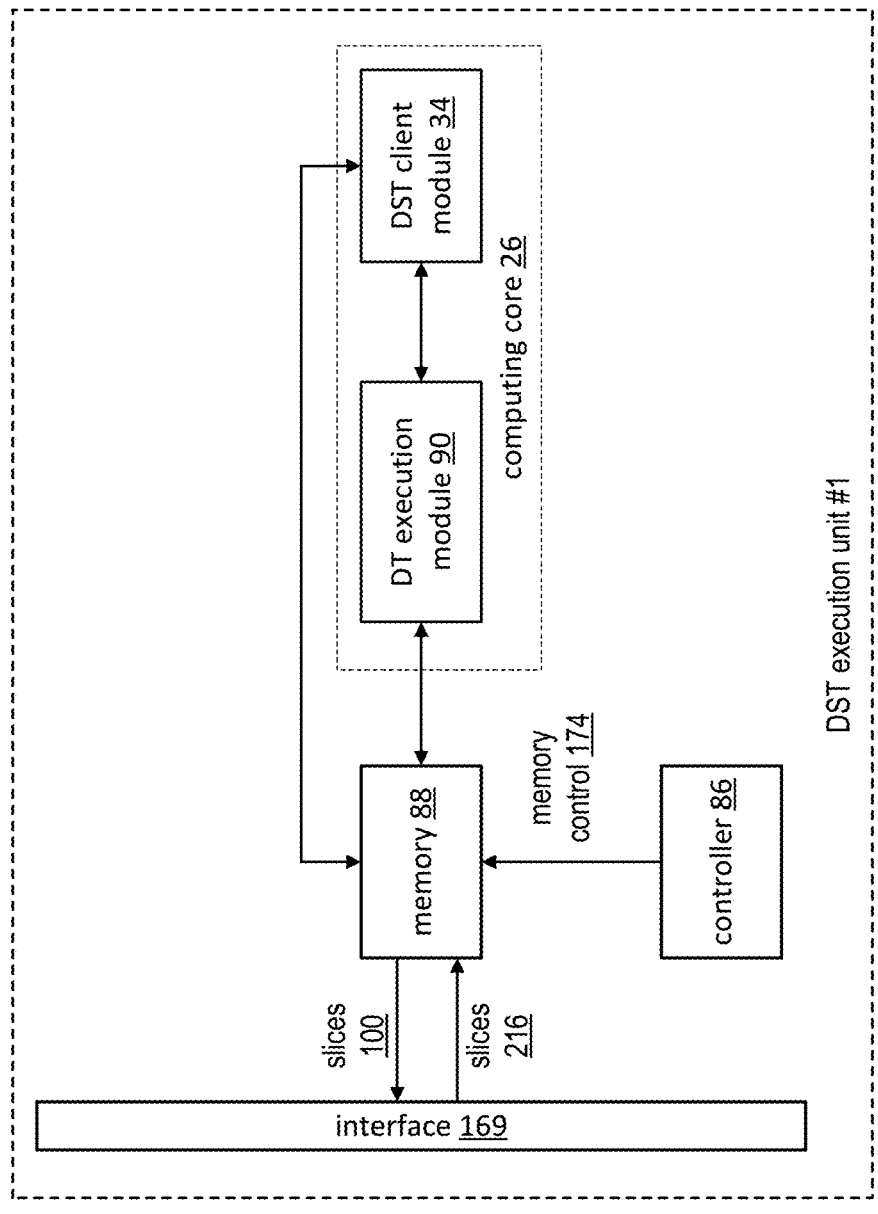
FIG. 6 is a schematic block diagram of an example of a storage operation of a DST execution unit in accordance with the present invention.
Figure 6:
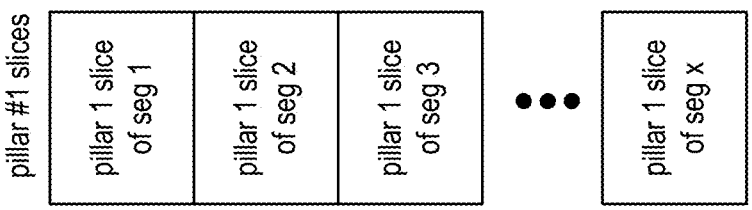

FIG. 6 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 7A:
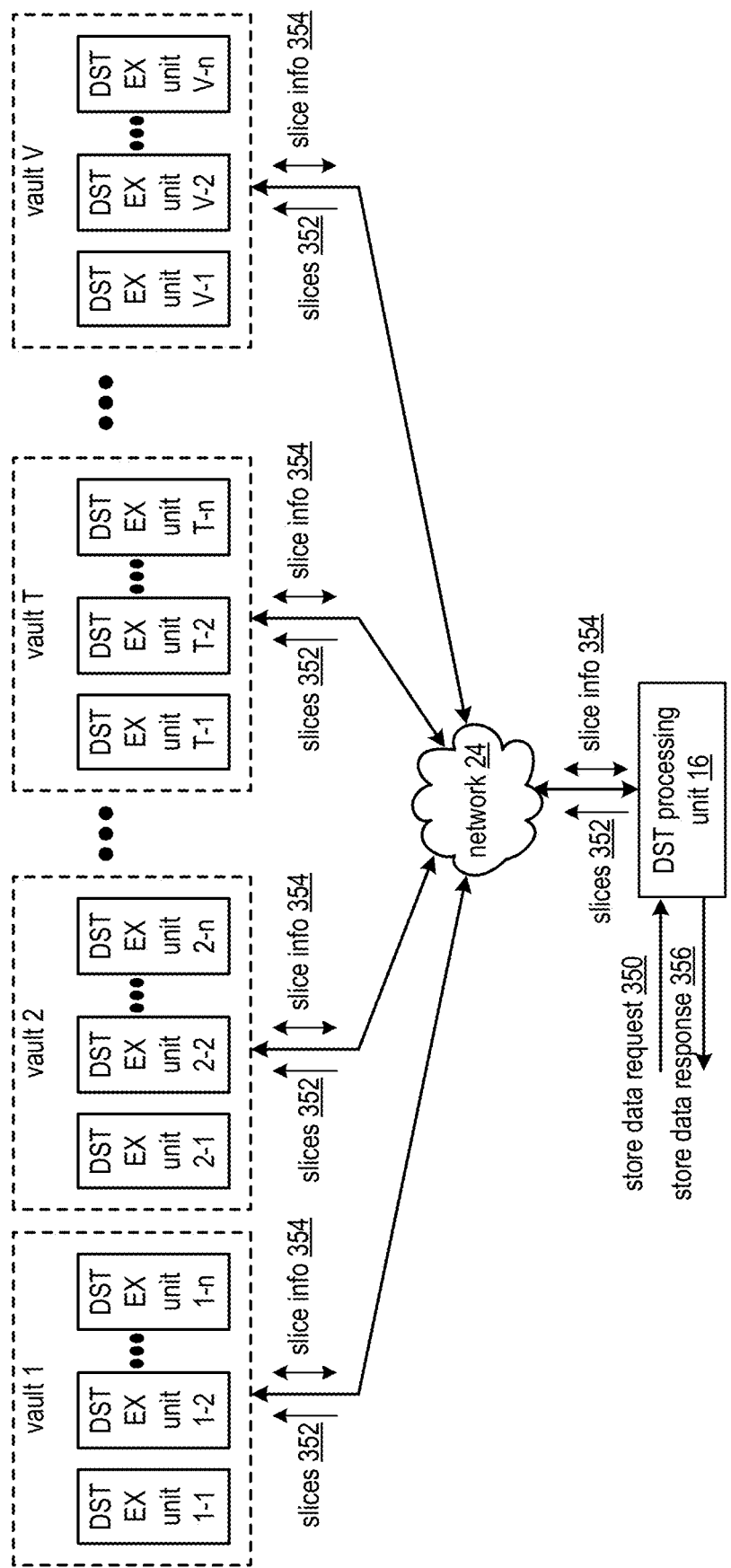
FIG. 7A is a schematic block diagram of a dispersed storage network in accordance with the present invention.

FIG. 7A is a schematic block diagram of a dispersed storage network (DSN) that includes a plurality of storage vaults, the network 24 of FIG. 1, and the distributed storage and task (DST) processing unit 16 of FIG. 1. The plurality of storage vaults may be implemented utilizing one or more sets of DST execution (EX) units. Each set of DST execution units may include any number of DST execution units. For example, vault 1 is implemented to include a first set of DST execution units 1-1 through 1-n, vault 2 is implemented to include a second set of DST execution units 2-1 through 2-n, etc. through vault V that is implemented to include a "Vth" set of DST execution units V–1 through V-n. Each DST execution unit may be implemented utilizing the DST execution unit 36 of FIG. 1.

The DSN functions to synchronize storage of newly stored data in the plurality of storage vaults. In an example of operation of the synchronous storage of the data, the DST processing unit 16 receives a store data request 350 from a requesting entity. The store data request 350 includes one or more of a data object for storage, metadata of the data object including one or more of a data identifier a data size indicator, an identifier of the requesting entity, a data type indicator, a data owner identifier, and a synchronization level indicator. Having received the store data request 350, the DST processing unit 16 identifies the plurality of storage vaults for storage of the data object. The identifying may be based on one or more of the metadata of the data object, an interpretation of system registry information, a predetermination, and an interpretation of a request. For example, the DST processing unit 16 identifies the storage vaults 1-V based on the identifier of the requesting entity.

Having identified the plurality of storage vaults, for each storage vault of the plurality of storage vaults, the DST processing unit 16 generates a corresponding plurality of sets of encoded data slices 352 in accordance with dispersal parameters associated with the storage vault. As a specific example, the DST processing unit 16 obtains the dispersal parameters for the storage vault, and when, the dispersal parameters are unique, dispersed storage error encodes the data object to produce another plurality of sets of encoded data slices 352.

Having produced the encoded data slices 352, for each storage vault of the plurality of storage vaults, the DST processing unit 16 initiates storage of the corresponding plurality of sets of encoded data slices 352. As a specific example, the DST processing unit 16 issues, via the network 24, one or more sets of write slice requests to a set of DST execution units associated with the storage vault, where the one or more sets of write slice requests includes the corresponding plurality of sets of encoded data slices 352. Having sent the encoded data slices 352 to the plurality of storage vaults for storage, the DST processing unit 16 receives, via the network 24, slice information 354 from at least some of the storage vaults. The slice information 354 includes one or more of a write slice response, a list slice request, a list slice response, a slice name, a slice revision number, a data object revision number, a slice revision number, a rollback write request, and a rollback write response.

Having received the slice information 354, the DST processing unit 16 interprets the received slice information 354 to determine how many storage vaults have successfully stored the corresponding plurality of sets of encoded data slices 352. As a specific example, for each storage vault slice information 354, the DST processing unit 16 determines whether the plurality of sets of encoded data slices have been successfully stored in at least a write threshold number of DST execution units associated with the storage vault. For instance, the DST processing unit 16 interprets write slice responses indicating success or failure of storage operations.

Having interpreted the slice information 354, when a vault threshold number (T) of storage vaults have successfully stored associated corresponding plurality of sets of encoded data slices, the DST processing unit 16 issues a store data response 356 to the requesting entity indicating successful storage and synchronization of the data. Alternatively, or in addition to, the DST processing unit 16 may abandon any storage retry process for storage of the data object in further storage vaults beyond the T number of storage vaults associated with the successful storage.

When a synchronization timeframe has expired and the number of storage vaults associated with successful storage is less than the vault threshold number, the DST processing unit 16 initiates a retry process to store the corresponding plurality of sets of encoded data slices in a storage vault associated with the unsuccessful storage. Alternatively, or in addition to, the DST processing unit 16 abandons the retry process for a particular storage vault in favor of continuing to wait and/or retry storage with other storage vaults.

Figure 7B:
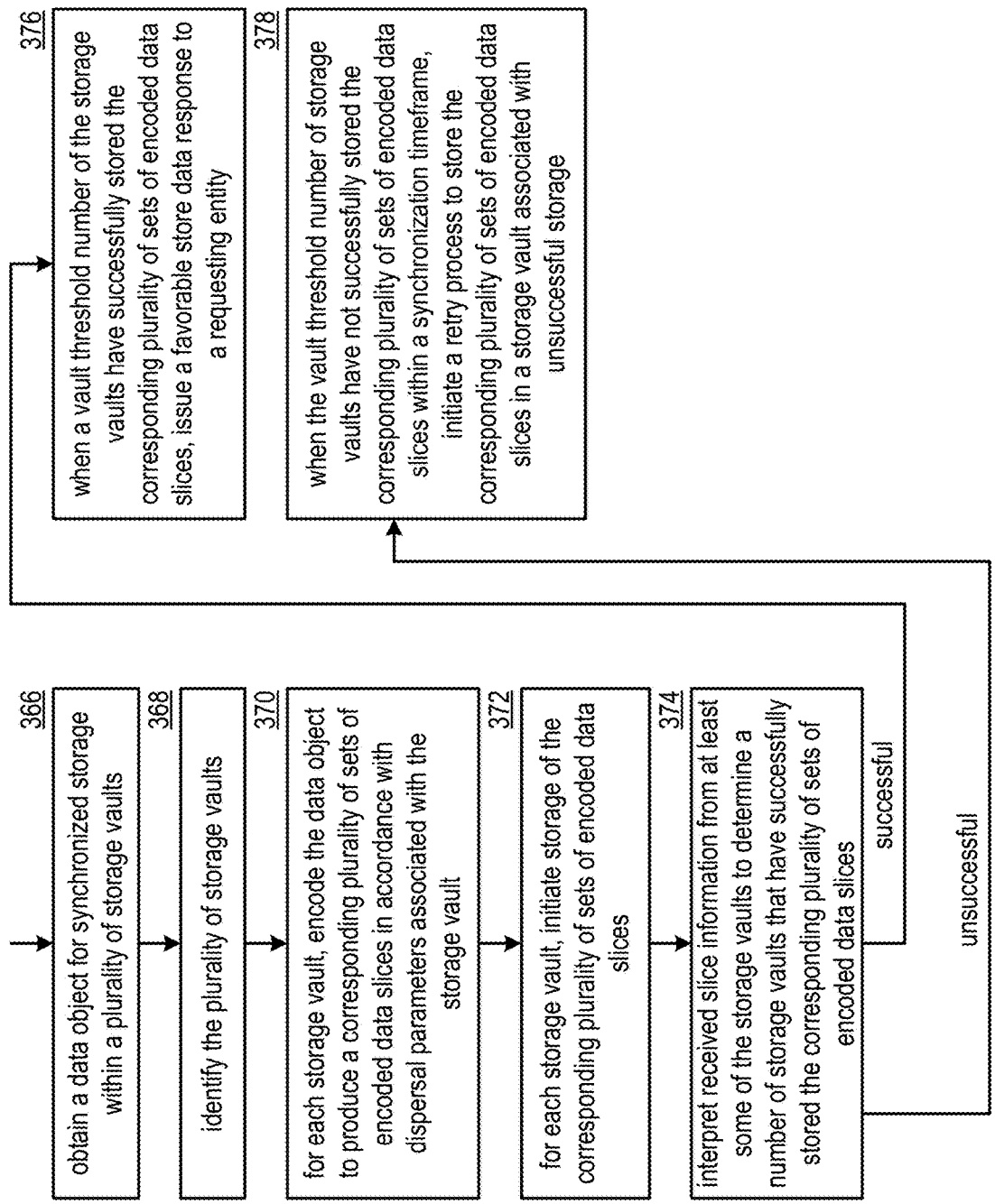
FIG. 7B is a flowchart illustrating an example of synchronizing storage of new data in a plurality of storage vaults in accordance with the present invention.

FIG. 7B is a flowchart illustrating an example of synchronizing storage of new data in a plurality of storage vaults. The method includes step 366 where a processing module (e.g., of a distributed storage and task (DST) processing unit) obtains a data object for synchronized storage within a plurality of storage vaults. The obtaining includes at least one of receiving the data object, generating the data object, and retrieving the data object. The method continues at step 368 where the processing module identifies the plurality of storage vaults. The identifying includes at least one of interpreting a request and interpreting system registry information.

For each storage vault, the method continues at step 370 where the processing module encodes the data object to produce a corresponding plurality of sets of encoded data slices in accordance with dispersal parameters associated with the storage vault. For example, the processing module determines the dispersal parameters associated with the storage vault and dispersed storage error encodes the data object using the dispersal parameters to produce the corresponding plurality of sets of encoded data slices.

For each storage vault, the method continues at step 372 where the processing module initiates storage of the corresponding plurality of sets of encoded data slices. For example, the processing module issues one or more sets of write slice requests to the storage vault, where the write slice requests include the corresponding plurality of sets of encoded data slices. The method continues at step 374 where the processing module interprets received slice information from at least some of the storage vaults to determine a number of storage vaults that have successfully stored the corresponding plurality of sets of encoded data slices. For example, the processing module counts a number of storage vaults where each storage vault has successfully stored at least a write threshold number of encoded data slices of each set of encoded data slices of the corresponding plurality of sets of encoded data slices.

When a vault threshold number of storage vaults have successfully stored the corresponding plurality of sets of encoded data slices, the method continues at step 376 where the processing module issues a favorable store data response to a requesting entity. For example, the processing module generates the favorable store data response to indicate at least one of successful storage and synchronization, a number of storage vaults successfully stored, a number of storage vaults on successfully stored, and a number of vaults of unknown storage status.

Alternatively, when the vault threshold number of storage vaults have not successfully stored the corresponding plurality of sets of encoded data slices within a synchronization timeframe, the method continues at step 378 where the processing module initiates a retry process to store the corresponding plurality of sets of encoded data slices in a storage vault associated with unsuccessful storage. For example, the processing module identifies a storage vault associated with unsuccessful storage, identifies the storage vault for the retry process, and re-sends the corresponding plurality of sets of encoded data slices to the storage vault.

Figure 8A:
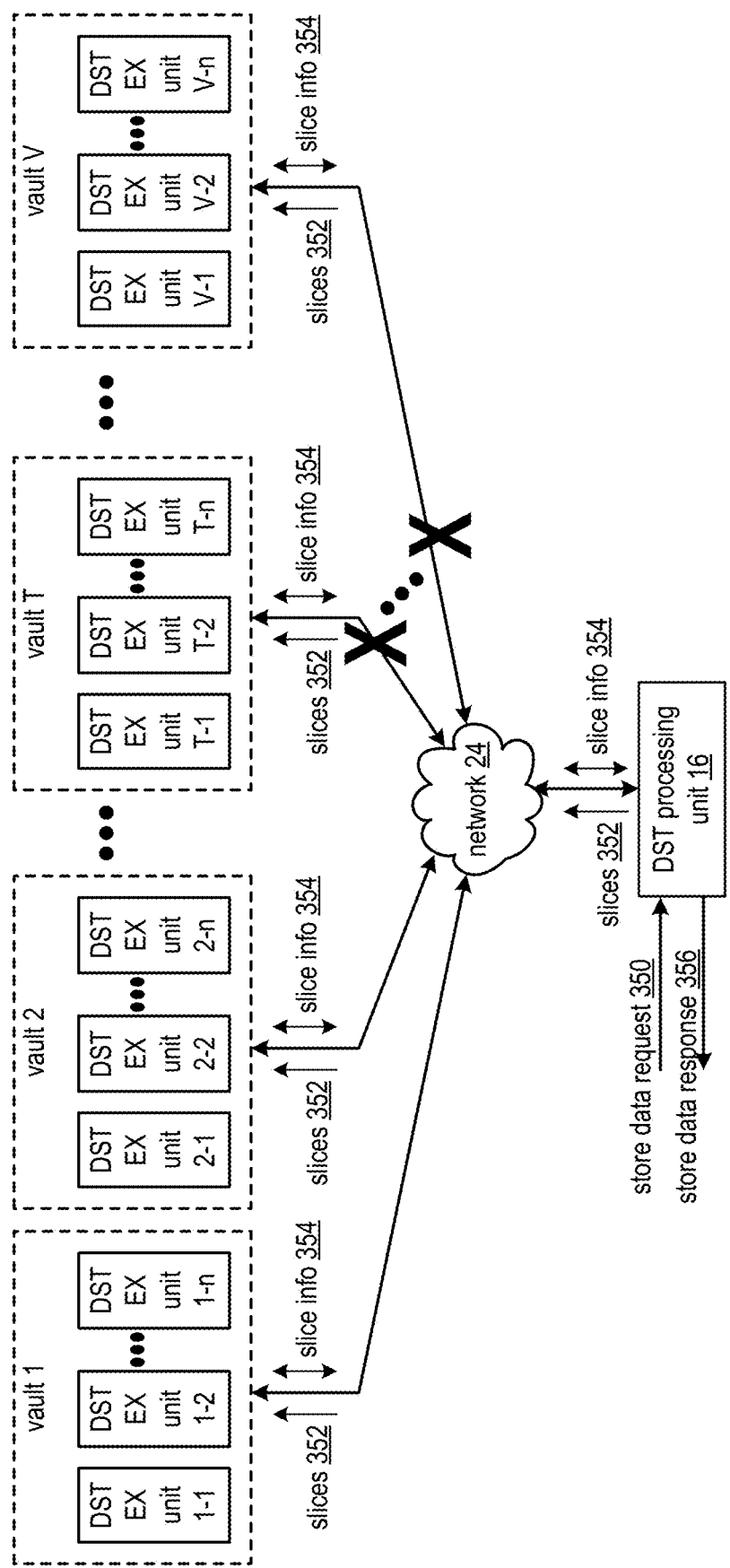
FIG. 8A is a schematic block diagram of another dispersed storage network in accordance with the present invention.

FIG. 8A is a schematic block diagram of another dispersed storage network (DSN) that includes a plurality of storage vaults, the network 24 of FIG. 1, and the distributed storage and task (DST) processing unit 16 of FIG. 1. The plurality of storage vaults may be implemented utilizing one or more sets of DST execution (EX) units. Each set of DST execution units may include any number of DST execution units. For example, vault 1 is implemented to include a first set of DST execution units 1-1 through 1-n, vault 2 is implemented to include a second set of DST execution units 2-1 through 2-n, etc. through vault V that is implemented to include a "Vth" set of DST execution units V–1 through V-n. Each DST execution unit may be implemented utilizing the DST execution unit 36 of FIG. 1.

The DSN functions to synchronize storage of newly stored data in the plurality of storage vaults. In an example of operation of the synchronous storage of the data, the DST processing unit 16 receives a store data request 350 from a requesting entity. The store data request 350 includes one or more of a data object for storage, metadata of the data object including one or more of a data identifier a data size indicator, an identifier of the requesting entity, a data type indicator, a data owner identifier, and a synchronization level indicator. Having received the store data request 350, the DST processing unit 16 identifies the plurality of storage vaults for storage of the data object. The identifying may be based on one or more of the metadata of the data object, an interpretation of system registry information, a predetermination, and an interpretation of a request. For example, the DST processing unit 16 identifies the storage vaults 1-V based on the identifier of the requesting entity.

Having identified the plurality of storage vaults, for each storage vault of the plurality of storage vaults, the DST processing unit 16 generates a corresponding plurality of sets of encoded data slices 352 in accordance with dispersal parameters associated with the storage vault. As a specific example, the DST processing unit 16 obtains the dispersal parameters for the storage vault, and when, the dispersal parameters are unique, dispersed storage error encodes the data object to produce another plurality of sets of encoded data slices 352.

Having produced the encoded data slices 352, for each storage vault of the plurality of storage vaults, the DST processing unit 16 initiates storage of the corresponding plurality of sets of encoded data slices. As a specific example, the DST processing unit 16 issues, via the network 24, one or more sets of write slice requests to a set of DST execution units associated with the storage vault, where the one or more sets of write slice requests includes the corresponding plurality of sets of encoded data slices 352. Having sent the encoded data slices to the plurality of storage vaults for storage, the DST processing unit 16 receives, via the network 24, slice information 354 from at least some of the storage vaults. The slice information 354 includes one or more of a write slice response, a list slice request, a list slice response, a slice name, a slice revision number, a data object revision number, a slice revision number, a rollback write request, and a rollback write response.

Having received the slice information 354, the DST processing unit 16 interprets the received slice information 354 to determine how many storage vaults have successfully stored the corresponding plurality of sets of encoded data slices. As a specific example, for each storage vault slice information 354, the DST processing unit 16 determines whether the plurality of sets of encoded data slices 352 have been successfully stored in at least a write threshold number of DST execution units associated with the storage vault. For instance, the DST processing unit 16 interprets write slice responses indicating success or failure of storage operations.

When the vault threshold number of storage vaults have not yet successfully stored the corresponding plurality of sets of encoded data slices within a synchronization timeframe, the DST processing unit 16 initiates a rollback process to abandon storing the data object in the plurality of storage vaults. As a specific example, the DST processing unit 16 issues, via the network 24, rollback requests to each storage vault to facilitate deletion of the pluralities of sets of encoded data slices.

Having issued the rollback request, the DST processing unit 16 generates a store data response 356 to indicate unsuccessful synchronize storage of the data object in the plurality of storage vaults. As a specific example, the DST processing unit 16 generates the store data response 356 to include an indicator of which storage vaults were unsuccessful and to include a root cause indicator for the unsuccessful storage. For instance, if one error indicated unable to communicate, and another error indicated invalid credentials, then the invalid credentials error would be returned to the requesting entity, as it provides more specific information about the error condition and about how it might be resolved. As such, each error message may be given a "specificity score" which can be used to evaluate and determine which error indicator to be returned. Having generated the store data response, the DST processing unit 16 sends the store data response 356 to the requesting entity.

Figure 8B:
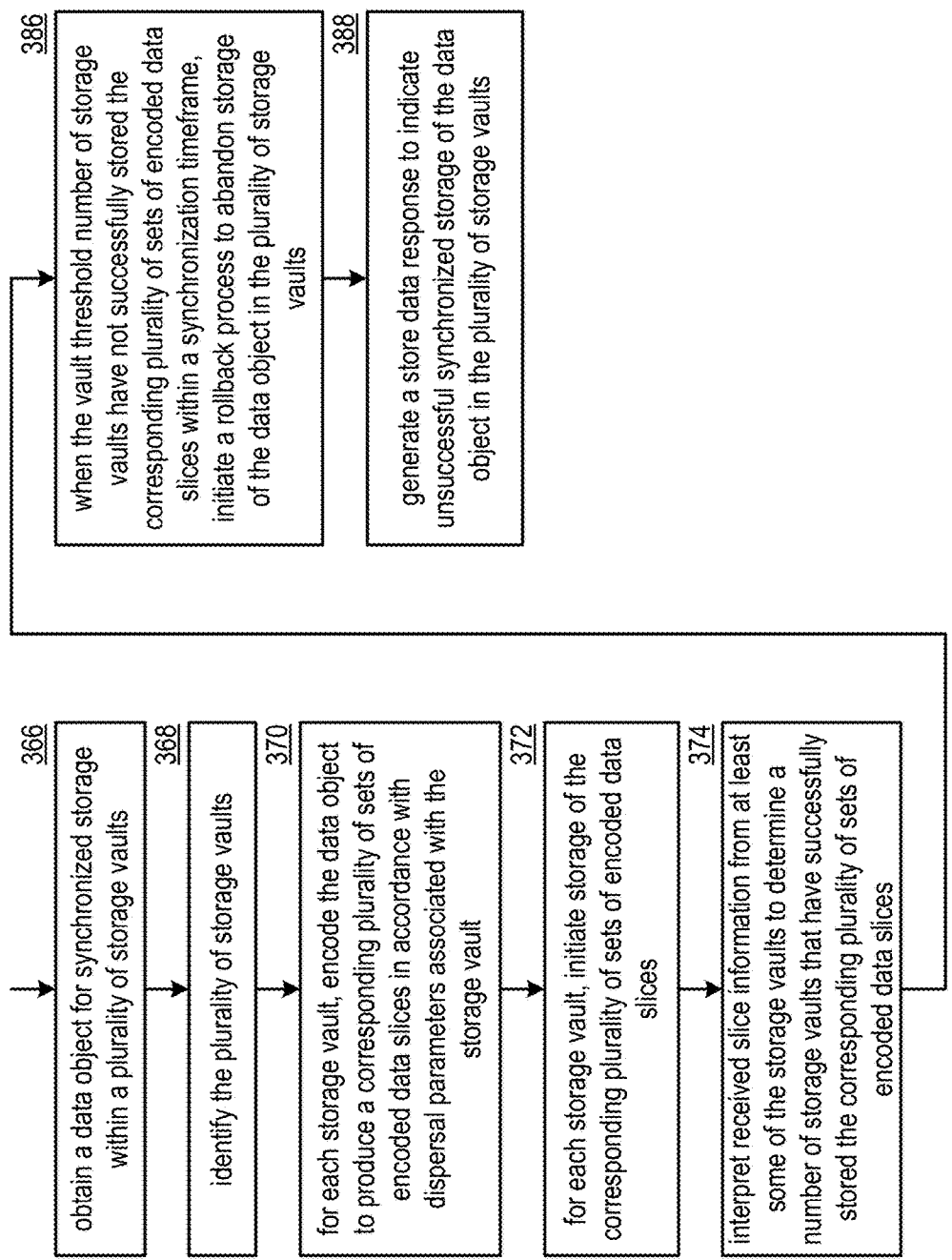
FIG. 8B is a flowchart illustrating another example of synchronizing storage of new data in a plurality of storage vaults in accordance with the present invention.

FIG. 8B is a flowchart illustrating another example of synchronizing storage of new data in a plurality of storage vaults, which includes similar steps to FIG. 7A. The method includes the steps 366-374 of FIG. 7A where a processing module (e.g., of a distributed storage and task (DST) processing unit) obtains a data object for synchronized storage within a plurality of storage vaults, identifies the plurality of storage vaults, encodes the data object for each storage vault to produce a corresponding plurality of sets of encoded data slices in accordance with dispersal parameters associated with the storage vault, initiates storage for each storage vault of the corresponding plurality of sets of encoded data slices, and interprets received slice information from at least some of the storage vaults to determine a number of storage vaults that have successfully stored the corresponding plurality of sets of encoded data slices.

When the vault threshold number of storage vaults have not successfully stored the corresponding plurality of sets of encoded data slices within a synchronization timeframe, the method continues at step 386 where the processing module initiates a rollback process to abandon storage of the data object in the plurality of storage vaults. For example, the processing module issues rollback requests to each storage vault of a plurality of storage vaults to facilitate deletion of the corresponding plurality of sets of encoded data slices.

The method continues at step 388 where the processing module generates a store data response to indicate unsuccessful synchronized storage of the data object in the plurality of storage vaults. For example, the processing module identifies one or more storage vaults associated with the unsuccessful storage, and for each, identifies one or more read causes associated with the unsuccessful storage, generates the store data response to include the identities of the one or more storage vaults associated with the unsuccessful storage, and, for each storage vault, the identified one or more causes, and sends the store data response to a requesting entity.

FIGS. 9A-B are schematic block diagrams of another dispersed storage network that includes that includes the distributed storage and task (DST) processing unit 16 of FIG. 1, the network 24 of FIG. 1, and a plurality of storage units, where the plurality of storage units support a plurality of virtual storage vaults 1-V. A first virtual storage vault of the plurality of virtual storage vaults is supported by a first set of storage units (e.g., SU 1-1 through 1-n) of the plurality of storage units, where the first set of storage units is a sub-set of the plurality of storage units. Each storage unit may be implemented utilizing the DST execution unit 36 of FIG. 1. The DSN functions to synchronize storage of data copies in the plurality of storage vaults.

FIG. 9A illustrates steps of an example of operation of the synchronizing of the storage of the data copies in the DSN where the DST processing unit 16 receives a store data request from a requesting entity. The store data request includes one or more of a data object 457 for storage, metadata of the data object including one or more of a data identifier a data size indicator, an identifier of the requesting entity, a data type indicator, a data owner identifier, and a synchronization level indicator. Having received the store data request, the DST processing unit 16 selects at least some of the plurality of virtual storage vaults for storage of the data object 457. The selecting may be based on one or more of the metadata of the data object, an interpretation of system registry information, a predetermination, and an interpretation of a request. For example, the DST processing unit 16 selects the storage vaults 1-T based on the identifier of the requesting entity and a requirement to store a threshold number (e.g., T) of copies of the data object.

Having selected the virtual storage vaults 1-T, for each virtual storage vault of the selected the virtual storage vaults, the DST processing unit 16 generates a corresponding plurality of sets of encoded data slices in accordance with dispersal parameters associated with the virtual storage vault. As a specific example, the DST processing unit 16 obtains the dispersal parameters for the storage vault from system registry information, and when, the dispersal parameters are unique, dispersed storage error encodes the data object to produce another plurality of sets of encoded data slices. As another specific example, the DST processing unit 16 dispersed storage error encodes the data object 457 using a common set of dispersal parameters to produce one plurality of sets of encoded data slices.

Having produced the encoded data slices, for each virtual storage vault of the selected virtual storage vaults, the DST processing unit 16 initiates storage of the corresponding plurality of sets of encoded data slices. As a specific example, the DST processing unit 16 issues, via the network 24, one or more sets of write slice requests to storage units 1-1 through 1-n, where the one or more sets of write slice requests includes the corresponding plurality of sets of encoded data slices 1-n. Having sent the encoded data slices to the selected virtual storage vaults for storage, the DST processing unit 16 receives, via the network 24, storage confirmation information from at least some of the selected virtual storage vaults. The storage confirmation information includes one or more of a write slice response, a list slice request, a list slice response, a slice name, a slice revision number, a data object revision number, a slice revision number, a rollback write request, and a rollback write response. For example, the DST processing unit 16 receives, via the network 24, storage confirmation information 1, 3-T from storage units of the corresponding virtual storage vaults 1, 3-T indicating that responding plurality of sets of encoded data slices 1-n have been successfully stored in the selected virtual storage vaults 1, 3-T.

Having received the storage confirmation information, the DST processing unit 16 interprets the received storage confirmation information to identify a storage vault that has not yet successfully stored a corresponding plurality of sets of encoded data slices within a storage time frame. The identifying includes one or more of interpreting storage confirmation information from virtual storage vaults associated with successful storage and receiving an unsuccessful storage indication. For example, the DST processing unit 16 indicates that virtual storage vault 2 has not stored the corresponding plurality of sets of encoded data slices 1-n within the storage timeframe when not receiving favorable storage confirmation information 2 from the storage units of the virtual storage vault 2.

Having identified the storage vault that has not yet successfully stored the corresponding plurality of sets of encoded data slices, the DST processing unit 16 updates an entry within a synchronization queue to associate the data object with the storage vault. As a specific example of the updating, the DST processing unit 16 creates a queue 2 (QUE2) entry that includes one or more of the data object 457, the data object identifier (ID), identity of the storage vault 2 associated with the unsuccessful storage, identity of another storage vault associated with successful storage, an identifier associated with storage of the data object in the identified other storage vault associated with the successful storage; and stores the entry in the synchronization queue within the memory 88 and/or within a synchronization queue structure within one or more storage vaults (e.g., the entry is encoded to produce entry slices for storage in a virtual storage vault associated with successful storage). Having updated the entry within the synchronization queue the DST processing unit 16 may issue a store data response to the requesting entity, where the store data response includes at least a portion of the entry.

FIG. 9B illustrates further steps of the example of operation of the synchronizing of the storage of the data copies in the DSN where, when the virtual storage vault that was unsuccessful in storing the plurality of sets of encoded data slices becomes available, the DST processing unit 16 facilitates storage of the data object in the virtual storage vault. The facilitating includes the DST processing unit 16 issuing, to at least some of the plurality of storage units, a transfer request to request to transfer a copy of a set of encoded data slices. For example, the DST processing unit 16 issues, via the network 24, the transfer request 1-n, where the DST processing unit 16 issues a first portion that includes a transfer request 1-9 (e.g., to transfer slices 1-9) to the virtual storage vault 1, and a second portion that includes a transfer request 10-n (e.g., to transfer slices 10-n) to the virtual storage vault 3.

At least some of the plurality of storage units receives a request to transfer a copy of the set of encoded data slices from two or more source virtual storage vaults of the plurality of virtual storage vaults to a destination virtual storage vault (e.g., virtual storage vault 2) of the plurality of storage vaults, where a data segment of the data is dispersed storage error encoded to produce the set of encoded data slices. The at least some of the plurality of storage units may include the storage units associated with the two or more source virtual storage devices and the storage units associated with the destination virtual storage vault.

The at least some of the plurality of storage units may receive the request to transfer the copy of the set of encoded data slices in accordance with a variety of transfer approaches. A first transfer approach includes receiving the request to transfer in response to a determination that the destination virtual storage vault failed a write request regarding the copy of the set of encoded data slices, where the write request is an instruction to write the copy of the set of encoded data slices to each of the two or more source virtual storage vaults and to the destination virtual storage vault. For example, the virtual storage vaults 1 and 3 received the request to transfer the copy of the set of encoded data slices when the write requests to the virtual storage vault 2 failed.

A second transfer approach includes receiving the request to transfer as part of the write request to write the copy of the set of encoded data slices to each of the two or more source virtual storage vaults and to the destination virtual storage vault, where a first portion of the write request writes the respective sub-sets of encoded data slices to the storage units supporting the two or more source virtual storage vaults and a second portion to transfer the copy of the sets of encoded data slices to the storage units supporting the destination virtual storage unit. For example, slices of the set of encoded data slices are written to the virtual storage vault 4 and copies of the set of encoded data slices are copied from the virtual storage vault 4 to at least one other virtual storage vault.

Having received the request to transfer the copy, each storage unit of the at least some of the plurality of storage units obtains a slice transfer map that, for the set of encoded data slices, identifies the two or more source virtual storage vaults. The obtaining the slice transfer map includes one or more of receiving the slice transfer map, retrieving the slice transfer map from memory, and generating the slice transfer map based on the request to transfer. For example, the DST processing unit 16 retrieves the slice transfer map from the memory 88 and sends, via the network 24, the slice transfer map to the virtual storage vaults 1-3, where the slice transfer map indicates that virtual storage vault 1 is to provide slices 1-9 to the virtual storage vault 2 and the virtual storage vault 3 is to provide slices 10-n to the virtual storage vault 2. The slice transfer map may indicate any combination of transferring of slices from any storage unit of any virtual storage vault to the destination virtual storage vault.

Having obtained the slice transfer map, each storage unit of the at least some of the plurality of storage units determines whether the storage unit supports one of the two or more source virtual storage vaults. For example, the virtual storage vault 1 and interprets the obtains slice transfer map to identify slice names associated with encoded data slices of the set of encoded data slices for transfer and to associate the slice names with the virtual storage vault 1.

For each supporting storage unit that supports one of the two or more source virtual storage vaults, each supporting storage unit determines, based on the slice transfer map, a sub-set of encoded data slices of the set of encoded data slices that is stored within the one of the two or more source virtual storage vaults by the each supporting storage unit. For example, the virtual storage vault 1 identifies slices 1-9 as the sub-set of encoded data slices of the set of encoded data slices that are stored within the virtual storage vault 1.

Having determined the sub-set of encoded data slices, each supporting storage unit sends the sub-set of encoded data slices to a corresponding storage unit of the plurality of storage units that is supporting the destination virtual storage vault. The sending the sub-set of encoded data slices includes a variety of sending approaches. A first sending approach includes sending, by a first supporting storage unit, a first encoded data slice to a first corresponding storage unit of the plurality of storage units that is supporting the destination virtual storage vault (e.g., storage unit 1-1 sends, via the network 24, encoded data slice 1 to storage unit 2-1), sending, by a second supporting storage unit, a second encoded data slice to a second corresponding storage unit of the plurality of storage units that is supporting the destination virtual storage vault (e.g., storage unit 1-2 sends, via the network 24, encoded data slice 2 to storage unit 2-2), sending, by a third supporting storage unit, a third encoded data slice to a third corresponding storage unit of the plurality of storage units that is supporting the destination virtual storage vault (e.g., storage unit 1-3 sends, via the network 24, encoded data slice 3 to storage unit 2-3), and sending, by a fourth supporting storage unit, a fourth encoded data slice to a fourth corresponding storage unit of the plurality of storage units that is supporting the destination virtual storage vault (e.g., storage unit 1-4 sends, via the network 24, encoded data slice 4 to storage unit 2-4).

A second sending approach of the sending the sub-set of encoded data slices includes sending, by a first supporting storage unit, a first and a second encoded data slice to a first corresponding storage unit of the plurality of storage units that is supporting the destination virtual storage vault (e.g., storage unit 1-1 sends, via the network 24, encoded data slices 1A and 1B to storage unit 2-1), and sending, by a second supporting storage unit, a third encoded data slice to a second corresponding storage unit of the plurality of storage units that is supporting the destination virtual storage vault (e.g., storage unit 1-2 sends, via the network 24, encoded data slice 2A to storage unit 2-2).

Having received one or more encoded data slices of the copy of encoded data slices, each of the corresponding storage units of the plurality of storage units that is supporting the destination virtual storage vault changes DSN addresses of the encoded data slices of the copy of encoded data slices to reflect that the copy is stored in the destination virtual storage vault. For example, storage unit 2-1 changes a slice name (e.g., DSN address) of the received encoded data slice 1 to replace a vault identifier associated with the virtual storage vault 1 to a vault identifier associated with the virtual storage vault 2.

Having stored the copy of the encoded data slices in the destination virtual storage vault, the DST processing unit 16 updates a slice storage table to include the DSN addresses of the encoded data slices stored in the destination virtual storage vault. For example, the DST processing unit 16 receives, via the network 24, storage confirmation information 2 from the storage units of the virtual storage vault 2, where the storage confirmation information 2 includes the DSN addresses of the encoded data slices stored in the destination virtual storage vault.

FIG. 9C is a flowchart illustrating another example of synchronizing storage of data copies. In particular, a method is presented for use in conjunction with one or more functions and features described in conjunction with FIGS. 1-4, 8A-B, and also FIG. 9C. The method includes step 400 where, in a dispersed storage network (DSN) that includes a plurality of storage units, where the plurality of storage units support a plurality of virtual storage vaults, where a first virtual storage vault of the plurality of virtual storage vaults is supported by a first set of storage units of the plurality of storage units, and where the first set of storage units is a sub-set of the plurality of storage units, at least some of the plurality of storage units receives a request to transfer a copy of a set of encoded data slices from two or more source virtual storage vaults of the plurality of virtual storage vaults to a destination virtual storage vault of the plurality of virtual storage vaults, where a data segment of data is dispersed storage error encoded to produce the set of encoded data slices. The at least some of the plurality of storage units may include the storage units associated with the two or more source virtual storage devices and the storage units associated with the destination virtual storage vault.

The receiving of a request to transfer includes a variety of receiving approaches. A first receiving approach includes receiving the request to transfer in response to a determination that the destination virtual storage vault a failed write request regarding the copy of the set of encoded data slices, where the write request is an instruction to write the copy of the set of encoded data slices to each of the two or more source virtual storage vaults and to the destination virtual storage vault. A second receiving approach includes receiving the request to transfer as part of a write request to write the copy of the set of encoded data slices to each of the two or more source virtual storage vaults and to the destination virtual storage vault, where a first portion of the write request writes the respective sub-sets of encoded data slices to the storage units supporting the two or more source virtual storage vaults and a second portion to transfer the copy of the sets of encoded data slices to the storage units supporting the destination virtual storage unit.

The method continues at step 402 where each storage unit of the at least some of the plurality of storage units obtains a slice transfer map that, for the set of encoded data slices, identifies the two or more source virtual storage vaults. The obtaining the slice transfer map includes one or more of receiving the slice transfer map, retrieving the slice transfer map from memory, and generating the slice transfer map based on the request to transfer.

The method continues at step 404 where each storage unit of the at least some of the plurality of storage units determines whether the each storage unit supports one of the two or more source virtual storage vaults (e.g., identifies an association with the set of encoded data slices). For each supporting storage unit that supports one of the two or more source virtual storage vaults, the method continues at step 406 where the each supporting storage unit determines, based on the slice transfer map, a sub-set of encoded data slices of the set of encoded data slices that is stored within the one of the two or more source virtual storage vaults by the each supporting storage unit (e.g., identify encoded data slices that the supporting storage unit is responsible for copying to the destination virtual storage vault).

The method continues at step 408 where each supporting storage unit sends the sub-set of encoded data slices to a corresponding storage unit of the plurality of storage units that is supporting the destination virtual storage vault. The sending the sub-set of encoded data slices includes a variety of sending approaches. A first sending approach includes sending, by a first supporting storage unit, a first encoded data slice to a first corresponding storage unit of the plurality of storage units that is supporting the destination virtual storage vault, sending, by a second supporting storage unit, a second encoded data slice to a second corresponding storage unit of the plurality of storage units that is supporting the destination virtual storage vault, sending, by a third supporting storage unit, a third encoded data slice to a third corresponding storage unit of the plurality of storage units that is supporting the destination virtual storage vault, and sending, by a fourth supporting storage unit, a fourth encoded data slice to a fourth corresponding storage unit of the plurality of storage units that is supporting the destination virtual storage vault.

A second sending approach of the sending the sub-set of encoded data slices includes sending, by a first supporting storage unit, a first and a second encoded data slice to a first corresponding storage unit of the plurality of storage units that is supporting the destination virtual storage vault and sending, by a second supporting storage unit, a third encoded data slice to a second corresponding storage unit of the plurality of storage units that is supporting the destination virtual storage vault.

The method continues at step 410 where each of the corresponding storage units of the plurality of storage units that is supporting the destination virtual storage vault changes DSN addresses of the encoded data slices of the copy of encoded data slices to reflect that the copy is stored in the destination virtual storage vault (e.g., change a vault identifier from a source virtual storage vault to the destination virtual storage vault). The method continues at step 412 where each of the corresponding storage units of the plurality of storage units that is supporting the destination virtual storage vault updates a slice storage table to include the DSN addresses of the encoded data slices stored in the destination virtual storage vault.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

FIG. 10A is a schematic block diagram of another dispersed storage network (DSN) that includes a set of distributed storage and task (DST) execution (EX) units and the network 24 of FIG. 1. The set of DST execution units includes an information dispersal algorithm (IDA) width number of DST execution units. For example, the set of DST execution units includes DST execution units 1-5 when the IDA width is 5. Each DST execution unit includes two or more memories, where each memory is associated with a unique memory location. For example, each DST execution unit includes four memories associated with memory locations L1-L4. Such a memory location includes at least one of a physical location within an equipment housing associated with the DST execution unit. The unique memory location may further include one or more distinguishing traits including one or more of a memory manufacturer identifier, a model number, a serial number, a time of manufacture, a software revision number, a memory age, a number of hours of operation, a historical failure record, an availability performance level, an expected meantime between failure metric, and an expected meantime to replacement metric. Each memory may be implemented utilizing the memory 88 of FIG. 3. Each DST execution unit may be implemented utilizing the DST execution unit 36 of FIG. 1.

The DSN functions to associate the memories (e.g., physical storage) with virtual addressing (e.g., a DSN address range or slice name range) utilized within the DSN in accordance with a selection approach to provide a system enhancement. A selected set of physical memories are mapped to a common DSN address range to facilitate access of encoded data slices stored in the set of selected memories, where the encoded data slices are associated with slice names that fall within the common DSN address range.

In an example of operation of the associating of the virtual addressing with selection of physical memories, a DST execution unit of the set of DST execution units detects a particular DSN address range (e.g., range 1) to be mapped to a physical memory location within a DST execution unit. The detecting includes at least one of interpreting system registry information, receiving a DSN address range assignment request, interpreting a DSN address range to memory location table to indicate that the DSN address range is unmapped, interpreting an error message, and determining to reallocate a mapping of the DSN address range from a current memory location association to a new memory location association.

One or more DST execution units of the set of DST execution units coordinates with the set of DST execution units the selection of a physical memory in each of the DST execution units of the set of DST execution units for the DSN address range in accordance with a selection approach to produce mapping information 420. The selection approaches includes at least one of a random approach, a minimize estimated correlated memory errors approach, and a selecting diverse memory types approach. The one or more DST execution units choose the selection approach based on one or more of a storage reliability level goal, historical storage reliability levels, and interpretation of system registry information, a predetermination, and an interpretation of an error message. For example, DST execution unit 2 chooses the selection approach to be the random approach on behalf of the set of DST execution units based on interpreting the system registry information.

The DST execution units perform the coordinating by exchanging, via the network 24, mapping information. The mapping information 420 includes a slice name range associated with a memory location. For example, the one or more DST execution units randomly selects memory locations when the selection approaches includes the random approach. As another example, the one or more DST execution units select memory locations to maximize differences in physical memory locations when the approach is selecting the diverse memory types. For instance, memory location 3 is selected for DST execution unit 1 (e.g., an associated memory is located within a middle of a memory rack), memory location 1 is selected for DST execution unit 2 (e.g., an associated memory is located on a left end of a memory rack), memory location 2 is selected for DST execution unit 3 (e.g., an associated memory is located off-center from the middle of a memory rack), memory location 4 is selected for DST execution unit 4 (e.g., an associated memory is located on a write end of a memory rack), and memory location 2 is selected for DST execution unit 5 (e.g., an associated memory is located off-center from the middle of a memory rack).

Having coordinated the selection of the physical memory locations, each DST execution unit updates a local DSN address to memory location table based on the mapping information 420. For example, DST execution unit 4 identifies a portion of the DSN address range associated with the DST execution unit 4 and updates a DSN address range to memory location table to associate the portion of the DSN address range with the corresponding memory location 4. As another example, the DST execution unit 4, for each sub-portion of the remaining portion of the DSN address range, identifies a corresponding other DST execution unit and associates the corresponding other DST execution unit with the sub-portion of the DSN address range to memory location table (e.g., DST execution unit 1 is associated with memory location 3, DST execution unit 2 is associated with memory location 1, DST execution unit 2 is associated with memory location 2, and DST execution unit 5 is associated with memory location 2.

Having updated the local DSN address range to memory location table, each DST execution unit utilizes the local DSN address range to memory location table when processing a subsequent slice access request that includes a slice name within the DSN address range. For example, DST execution unit 5 receives a slice access request that includes a slice name of the common DSN address range 1, accesses the local DSN address range to memory location table to identify memory location 2 as associated with the common DSN address range 1, and accesses an encoded data slice of the slice name within the memory location 2.

FIG. 10B is a flowchart illustrating an example of associating virtual addressing with physical storage. The method includes step 424 where a processing module of a plurality of processing modules (e.g., of a storage unit of a plurality of storage units) identifies a DSN address range to be mapped to a physical memory location within a storage unit of a set of storage units. The identifying includes at least one of interpreting system registry information, receiving a DSN address range assignment request, detecting that the DSN address range is unmapped, and determining to reallocate mapping of the DSN address range.

The method continues at step 426 where at least some storage units of the set of storage units coordinates selection of the physical memory location to be mapped to the DSN address range in accordance with a selection approach to produce mapping information. For example, the storage units exchange mapping information to provide the coordination. As another example, the storage units choose the selection approach and choose the physical memory location in accordance with the chosen selection approach.

The method continues at step 428 where each storage unit updates a local DSN address range to memory location table based on the mapping information. For example, the processing module identifies a portion of the DSN address range associated with a corresponding storage unit, updates the DSN address range to memory location table to associate the portion of the DSN address range with a corresponding memory location of the mapping information, and associates other sub-portions with other storage units of the set of storage units.

The method continues at step 430 where the storage unit receives a slice access request. For example, the processing module receives a slice access request from a requesting entity, where the slice access request includes at least one of a read slice request, a write slice request, a list slice request, and a delete slice request. The method continues at step 432 where the storage unit identifies a memory location corresponding to a slice name of the slice access requests based on an interpretation of the local DSN address range to memory location table of the storage unit. For example, the processing module accesses the local DSN address range to memory location table using a slice name of the slice access request to identify the memory location and accesses the memory location to process the slice access requests.

FIG. 11A is a schematic block diagram of another dispersed storage network (DSN) that includes a plurality of storage vaults, the network 24 of FIG. 1, and the distributed storage and task (DST) processing unit 16 of FIG. 1. The plurality of storage vaults may be implemented utilizing one or more sets of DST execution (EX) units. Each set of DST execution units may include any number of DST execution units. For example, vault 1 is implemented to include a first set of DST execution units 1-1 through 1-n, vault 2 is implemented to include a second set of DST execution units 2-1 through 2-n, etc. through vault V that is implemented to include a "Vth" set of DST execution units V-1 through V-n. Each DST execution unit may be implemented utilizing the DST execution unit 36 of FIG. 1.

The DSN functions to pace ingestion of data to be stored in the plurality of storage vaults. In an example of operation of the pacing of the data to be stored in the plurality of storage vaults, the DST processing unit 16 receives a portion of a data stream 440 from a requesting entity. Having received the portion, for each storage vault, the DST processing unit 16 dispersed storage error encodes the portion of the data stream in accordance with dispersal parameters of the storage vault to produce a corresponding plurality of sets of encoded data slices 442. For example, the DST processing unit 16 obtains the dispersal parameters for the storage vault, and when the parameters are unique, dispersed storage error encodes the portion of the data stream to produce the plurality sets of encoded data slices 442, or, when the dispersal parameters are not unique, the DST processing unit 16 reuses another plurality of sets of encoded data slices 442 previously produced.

Having produced the encoded data slices 442, for each storage vault, the DST processing unit 16 facilitates storage of the corresponding plurality of sets of encoded data slices 442. For example, the DST processing unit 16 issues, via the network 24, one or more sets of write slice requests to the storage vault, where the one or more sets of write slice requests includes the corresponding plurality of sets of encoded data slices 442.

Having initiated the storage of the portion of the data stream, the DST processing unit 16 determines fastest and slowest storage vaults based on received slice information 444. For example, the DST processing unit 16 identifies a first storage vault confirming storage of the portion as the fastest storage vault and identifies a last storage vault confirming storage as the slowest storage vault. Having identified the fastest and slowest storage vaults, the DST processing unit 16 determines a fastest ingestion rate for the fastest storage vault and a slowest ingestion rate for the slowest storage vault. For example, the DST processing unit 16 divides a size of the portion by a storage time.

Having determined the fastest and slowest ingestion rates, the DST processing unit 16 determines a desired portion size based on the fastest ingestion rate and the slowest ingestion rate. For example, the DST processing unit 16 identifies a maximum allowable amount of a difference in data stored based on the fastest and slowest ingestion rates and a processing capacity level. Having determined the desired portion size, the DST processing unit 16 issues stream pacing information 446 to the requesting entity, where the stream pacing information includes one or more of the desired portion size of a next portion, a request to stop sending the data stream until a difference between an amount of data ingestion by the fastest storage vault an amount of data ingestion by the slowest storage vault is greater than a high threshold level, and a request to resume sending of the data stream when the difference is less than a low threshold level.

FIG. 11B is a flowchart illustrating an example of pacing ingestion of data into a plurality of storage vaults. The method includes step 454 where a processing module (e.g., of a distributed storage and task (DST) processing unit) receives a portion of a data stream from a requesting entity for storage in a plurality of storage vaults. For each storage vault, the method continues at step 456 where the processing module encodes the portion of the data stream in accordance with dispersal parameters of the storage vault to produce a corresponding plurality of sets of encoded data slices. For example, the processing module obtains the dispersal parameters for the storage vault and dispersed storage error encodes the portion of the data stream using the dispersal parameters to produce the plurality of sets of encoded data slices when substantially the same dispersal parameters have not already been utilized to produce encoded data slices for another storage vault.

For each storage vault, the method continues at step 458 where the processing module facilitates storage of the corresponding plurality of sets of encoded data slices in the storage vault. For example, the processing module issues write slice requests to the storage vault, where the requests includes the corresponding plurality of sets of encoded data slices, receives read slice responses, and timestamps the write slice responses when receiving responses to produce an ingestion rate for a corresponding storage vault.

The method continues at step 460 where the processing module determines an ingestion rate capability level for the plurality of storage vaults. For example, the processing module determines an ingestion rate for each storage vault based on the received write slice responses and generates the ingestion rate capability level based on a fastest ingestion rate and a slowest ingestion rate (e.g., such that required memory and processing resource utilization levels are within capability and capacity limitations).

The method continues at step 462 where the processing module issues stream pacing information to the requesting entity based on the ingestion rate capability level. For example, the processing module generates the stream pacing information to include one or more of the ingestion rate capability level for the plurality of storage vaults, a desired portion size, an estimated time of data transmission, a request to stop sending the data stream, and a request to resume sending of the data stream.

FIG. 12A is a schematic block diagram of another dispersed storage network (DSN) that includes a plurality of storage vaults, the network 24 of FIG. 1, and at least two distributed storage and task (DST) processing units 1-2. Each DST processing unit may be implemented utilizing the DST processing unit 16 of FIG. 1. The plurality of storage vaults may be implemented utilizing one or more sets of DST execution (EX) units. Each set of DST execution units may include any number of DST execution units. For example, vault 1 is implemented to include a first set of DST execution units 1-1 through 1-n, vault 2 is implemented to include a second set of DST execution units 2-1 through 2-n, etc. through vault V that is implemented to include a "Vth" set of DST execution units V-1 through V-n. Each DST execution unit may be implemented utilizing the DST execution unit 36 of FIG. 1.

The DSN functions to synchronously store similar data in the plurality of storage vaults. In an example of operation of the synchronous storage of the similar data, the two or more DST processing units receive a data object for storage. For example, DST processing units 1-2 receives a data object A for storage in the plurality of storage vaults. Alternatively, the two or more DST processing units substantially simultaneously receive a unique data object, where each unique data object is associated with a common data identifier.

Having received the data object for storage, each DST processing unit, for each storage vault, dispersed storage error encodes the data object in accordance with dispersal parameters of the storage vault to produce a corresponding plurality of sets of encoded data slices. For example, DST processing units 1-2 each obtains the dispersal parameters for the storage vault, and when the dispersal parameters are unique, dispersed storage error encodes the data object A to produce the plurality of sets of encoded data slices. Alternatively, when the dispersal parameters are not unique, each DST processing unit reuses another plurality of sets of encoded data slices.

Having generated the encoded data slices, each DST processing unit generates a unique revision number to be associated with all of the plurality of sets of encoded data slices. The DST processing unit generates the unique revision number to include a time-based portion, an operation count portion, and a watermark portion. The time-based portion includes a real-time indicator that is ever increasing. For example, the DST processing unit interprets a system clock to produce the time-based portion. The operation count portion includes an ever-increasing number for a series of related operations. For example, the DST processing unit 16 chooses a number of bits L for the operation count portion such that no more than $2^L$ operations can be generated for the same data object by the same DST processing unit for a time resolution of the time-based portion. For instance, the DST processing unit is limited to 128 update operations on the same data object within one millisecond when the time resolution is one millisecond and the number of bits of the operation count portion is 7 (e.g., L=7). The watermark portion includes at least one of a random number, a pseudorandom number, and a result of applying the deterministic function to at least one of the data object, the data identifier, a vault identifier (ID), and a requesting entity ID.

Having generated the unique revision number, for each storage vault, each DST processing unit facilitates storage of the corresponding plurality of sets of encoded data slices utilizing the corresponding unique revision number. For example, DST processing unit 1 issues, via the network 24, a set of write slice requests to the DST execution units of the storage vault, where the set of write slice requests includes the corresponding plurality of sets of encoded data slices and the corresponding unique revision number.

Subsequent to the storage of the plurality of sets of encoded data slices, at least one of the DST processing units and a synchronizing agent facilitates a data synchronization process based on the unique revision numbers of the store data such that a plurality of sets of encoded data slices of the corresponding data object is stored in each storage vault for each unique revision number.

FIG. 12B is a flowchart illustrating an example of synchronously storing similar data. The method includes step 470 where a processing unit of two or more processing units receives a data object for storage in a plurality of storage vaults. For example, each processing unit receives a common data object. As another example, each processing unit receives a different data object that share a common data identifier. The receiving includes at least one of receiving the data object substantially simultaneously and a first processing unit generating the data object and a second processing unit receiving the data object.

For each storage vault, the method continues at step 472 where each processing unit encodes the data object in accordance with dispersal parameters of the storage vault to produce a corresponding plurality of sets of encoded data slices. For example, each processing unit obtains the dispersal parameters and dispersed storage error encodes the data object to produce the corresponding plurality of sets of encoded data slices The method continues at step 474 where each processing unit generates a unique revision number to associate with the data object. For example, each processing unit generates the unique revision number to include at least one ever increasing portion and at least one watermark portion. The ever-increasing portion includes one or more of an ever-increasing time portion and an ever increasing operation portion. The watermark portion includes at least one of a random number, a pseudorandom number, and a result of applying a deterministic function to at least a portion of one or more of the data object and the data object identifier.

For each storage vault, the method continues at step 476 where each processing unit facilitates storage of the corresponding plurality of sets of encoded data slices with the unique revision number. For example, each processing unit issues one or more sets of write slice requests to the storage vault, where the write slice requests include this corresponding plurality of sets of encoded data slices and the corresponding unique revision number.

The method continues at step 478 where at least one processing unit facilitates data synchronization between the plurality of storage vaults based on the unique revision numbers of stored data. For example, the processing unit maintains both or eliminates a revision. When maintaining, the processing unit maintains both revisions of a common data object in accordance with a predetermination when the ever-increasing portion is substantially the same. As another example, the processing unit selects a revision for elimination by at least one of a random selection, selecting a revision with a highest ever-increasing portion, and selecting a revision with a watermark portion corresponding to a priority revision.

FIG. 13A is a schematic block diagram of another dispersed storage network (DSN) that includes a plurality of S number of sites, the network 24 of FIG. 1, and one or more distributed storage and task (DST) processing units. For example, a DST processing unit 1 is utilized to store data 484 and a DST processing unit 2 is utilized to produce recovered data 486. Each DST processing unit may be implemented utilizing the DST processing unit 16 of FIG. 1. Each site includes one or more DST execution (EX) units of a set of DST execution units. For example, each site includes four DST execution units when four sites are implemented, an information dispersal algorithm (IDA) width n of a dispersed error coding function is 16, one primary encoded data slice is to be stored at each of the DST execution units, and an even distribution of DST execution units at each of the sites is utilized. For instance, DST execution units 1-4 are implemented at site 1, DST execution units 5-8 are implemented at site 2, DST execution units 9-12 are implemented at site 3, and DST execution units 13-16 are implemented at site 4. Each DST execution unit may be implemented utilizing the DST execution unit 36 of FIG. 1.

The DSN functions to access data for storage in the DST execution units of the plurality of sites. The accessing of the data includes storing the data and retrieving stored data from DST execution units at any one site to produce recovered data. In an example of operation of the storing of the data, the DST processing unit 1 receives the data 484 for storage in the n DST execution units at the S sites. The DST processing unit 1 obtains dispersal parameters that includes the IDA with and a decode threshold number, where the decode threshold number includes a minimum number of retrieved encoded data slices required to re-create a portion of the data. The obtaining includes at least one of interpreting system registry information, interpreting a query response, and receiving the dispersal parameters.

Having obtained the dispersal parameters, the DST processing unit 1 dispersed storage error encodes the data using the dispersal parameters to produce a plurality of sets of encoded data slices, where each set of encoded data slices includes the IDA width number n of the encoded data slices. Having produced the encoded data slices, the DST processing unit 1 determines a number E of extra encoded data slices to generate based on one or more of the dispersal parameters and the number of sites S, such that the data is recoverable by accessing encoded data slices that anyone of the S sites. As a specific example, the DST processing unit 1 determines the number E of extra encoded data slices in accordance with a formula: $E=k-(n/S)$. For instance, $E=10-(16/4)=6$, when the decode threshold is 10, the IDA width is 16, and the number of sites is 4, where the DST execution units are evenly distributed amongst the sites.

Having determined the number of extra encoded data slices, for each set of encoded data slices, the DST processing unit 1 dispersed storage error encodes the data to generate the E extra encoded data slices. As a specific example, the DST processing unit 1 extends an encoding matrix that was utilized to produce the plurality of sets of encoded data slices to produce an extended matrix (e.g., adding E rows to the encoding matrix) and matrix multiplies at least a portion of the extended matrix by the data to produce the extra encoded data slices. For instance, the DST processing unit 1 generates extra encoded data slices 17-22 when E=6.

Having generated the extra encoded data slices, the DST processing unit 1 facilitates storage of the plurality of sets of encoded data slices in the set of DST execution units. As a specific example, the DST processing unit 1 issues, via the network 24, one or more sets of write slice requests to the set of DST execution units, where the one or more sets of write slice requests includes the plurality of sets of encoded data slices and where each set of encoded data slices is substantially evenly distributed amongst the set of DST execution units (e.g., a unique encoded data slice is sent to each DST execution unit at each site).

Having facilitated the storage of the plurality of sets of encoded data slices, the DST processing unit 1 facilitates storage of the extra encoded data slices in at least one DST execution unit at each site. As a specific example, the DST processing unit 1 issues, via the network 24, another set of write slice requests to at least one DST execution unit at each site, where the other set of write slice requests includes the extra encoded data slices. For instance, the DST processing unit 1 facilitates storage of the extra encoded data slices in just one DST execution unit at site 1. As another instance, the DST processing unit 1 facilitates storage of the extra encoded data slices in each DST execution unit at site 1.

In an example of operation of the retrieving of the stored data from the DST execution units at any one site to produce the recovered data 486, the DST processing unit 2 obtains, via the network 24, from any one site, for each set of encoded data slices, the corresponding unique encoded data slices of a set of encoded data slices from each DST execution unit and from one or more of the DST execution units at the site, the extra encoded data slices to produce in total at least a decode threshold number of encoded data slices of the set of encoded data slices. For instance, the DST processing unit 2 issues read slice requests to the DST execution units 13-16 to obtain, for each set of encoded data slices, encoded data slices 13-16 and extra encoded data slices 17-22; and receives read slice responses that includes encoded data slices 13-22. Having received the decode threshold number of encoded data slices for each set of encoded data slices, the DST processing unit 2 dispersed storage error decodes each decode threshold number of encoded data slices to produce a recovered data segment and aggregates a plurality of recovered data segments to produce the recovered data 486.

FIG. 13B is a flowchart illustrating an example of accessing data. The method includes step 490 where a processing module of one or more processing modules (e.g., of a distributed storage and task (DST) processing unit of one or more DST processing units) receives data for storage in a set of storage units at S sites. The receiving may further include identifying the set of storage units and the sites based on interpreting system registry information The method continues at step 492 where the processing module dispersed storage error encodes the data using the dispersal parameters to produce a plurality of sets of n encoded data slices. For example, the processing module dispersed storage error encodes the data using an encoding matrix of the dispersal parameters to produce each plurality of sets of encoded data slices.

For each set of encoded data slices, the method continues at step 494 where the processing module determines a number E of extra encoded data slices to generate based on the dispersal parameters and the number of S sites. For example, the processing module calculates the number E of extra encoded data slices in accordance with a formula: $E=k-(n/S)$, where $k=a$ decode threshold number of the dispersal parameters, $n=$an information dispersal algorithm (IDA) number n of the dispersal parameters, and $S=$the number of sites.

For each set of encoded data slices, the method continues at step 496 where the processing module dispersed storage error encodes the data to generate the E extra encoded data slices. For example, the processing module encodes the data using at least a portion (e.g., E rows) of an extended portion of the encoding matrix to produce the extra encoded data slices. The method continues at step 498 where the processing module facilitates storage of the plurality of sets of n encoded data slices in the set of storage units. For example, the processing module sends the plurality of sets of encoded data slices to the storage units for storage, where one encoded data slice is sent to a corresponding one storage unit of the set of storage units when an even distribution approach is utilized.

For each set of encoded data slices, the method continues at step 500 where the processing module facilitates storage of the E extra encoded data slices in one or more storage units at each site. For example, the processing module selects one or more of available storage units as the one or more storage units (e.g., a random selection, a selection based on most favorable performance, a selection based on most favorable available storage capacity, a selection in accordance with a predetermination) and sends the extra encoded data slices to the one or more storage units at each site for storage.

When recovering the data from the set of storage units, the method continues at step 502 where the processing module selects one site for a recovery process. For example, the processing module selects based on one or more of a site performance level, a storage unit performance level, a system registry information, a request, and a favorable proximity to the site. The method continues at step 504 where the processing module obtains unique encoded data slices for each set of encoded data slices from each storage unit at the selected site. For example, the processing module issues read slice requests to each storage unit, receives read slice responses, and extracts encoded data slices as the unique encoded data slices.

The method continues at step 506 where the processing module obtains the E extra encoded data slices from the corresponding one or more storage units at the selected site. For example, the processing module identifies the one or more storage units (e.g., initiating a query, interpreting a query response, and receiving identifiers), issues read slice requests to the identified one or more storage units, receives one or more read slice responses, and extracts encoded data slices from the one or more read slice responses as the extra encoded data slices.

For each set of encoded data slices, the method continues at step 508 where the processing module combines the obtained unique encoded data slices and the obtained E extra encoded data slices to produce a decode threshold number of encoded data slices. For example, for each set, the processing module of appends the extra encoded data slices to the unique encoded data slices.

For each set of encoded data slices, the method continues at step 510 where the processing module dispersed storage error decodes the corresponding decode threshold number of encoded data slices to reproduce the data. For example, the processing module decodes each decode threshold number of encoded data slices to produce a recovered data segment and aggregates a plurality of recovered data segments to produce recovered data.

FIG. 14A is a schematic block diagram of another dispersed storage network (DSN) that includes a plurality of storage vaults, the network 24 of FIG. 1, and the distributed storage and task (DST) processing unit 16 of FIG. 1. The plurality of storage vaults may be implemented utilizing one or more sets of DST execution (EX) units. Each set of DST execution units may include any number of DST execution units. For example, vault 1 is implemented to include a first set of DST execution units 1-1 through 1-n, vault 2 is implemented to include a second set of DST execution units 2-1 through 2-n, etc. through vault V that is implemented to include a "Vth" set of DST execution units V-1 through V-n. Each DST execution unit may be implemented utilizing the DST execution unit 36 of FIG. 1.

The DSN functions to recover stored data to produce recovered data 516. In an example of operation of the recovering of the stored data, the DST processing unit 16, for each storage vault, determines a slice retrieval performance level. The determining includes at least one of performing a test (e.g., issuing a read slice request, receiving a read slice response, interpreting timing of the response), receiving the retrieval performance level, interpreting an error message, and performing a lookup.

Having determined the slice retrieval performance level, the DST processing unit 16 selects two or more storage vaults for retrieval based on the slice retrieval performance levels. The selecting includes one or more of determining a number of the two or more storage vaults (e.g., based on a lookup, based on a requirement for a particular performance level) and identifying the two or more storage vaults associated with most favorable slice retrieval performance levels.

Having selected the two or more storage vaults, the DST processing unit 16 identifies a plurality of data segments associated with the store data for retrieval. The determining includes at least one of interpreting a dispersed hierarchical index entry associated with the stored data, performing a lookup, and receiving a number of data segments indicator.

For each data segment, the DST processing unit 16 assigns a storage vault for retrieval to produce assignment information. For example, the DST processing unit 16 maps the data segments to the selected two or more storage vaults in accordance with an assignment approach (e.g., even distribution, in accordance with the slice retrieval performance level of each storage vault).

Having assigned the storage vaults for retrieval, the DST processing unit 16 facilitates recovery of each data segment from the selected two or more storage vaults in accordance with the assignment information to produce recovered data. For example, for each data segment, the DST processing unit 16 issues, via the network 24, a set of read slice requests, receives, via the network 24, read slice responses, extracts encoded data slices from the responses, dispersed storage error decodes a decode threshold number of extracted encoded data slices to reproduce the data segment (e.g., utilizing dispersal parameters associated with the storage vault), and aggregates the reproduced data segments to produce the recovered data 516.

FIG. 14B is a flowchart illustrating an example of recovering stored data. The method includes step 520 where a processing module (e.g., of a distributed storage and task (DST) processing unit) determines to recover a data object from one or more storage vaults of a plurality of storage vaults where the data object has been synchronously stored amongst the plurality of storage vaults. For example, the processing module receives a retrieval request and identifies the plurality of storage vaults based on the retrieval request (e.g., by performing a lookup, by receiving the identities of the storage vaults).

For each storage vault, the method continues at step 522 where the processing module determines a slice retrieval performance level. The determining includes at least one of performing a lookup, initiating a test, and interpreting test results.

The method continues at step 524 where the processing module selects two or more storage vaults of the plurality of storage vaults for retrieval based on the slice retrieval performance levels. For example, the processing module determines a number based on a performance requirement and the slice retrieval performance levels and identifies most favorably performing storage units.

The method continues at step 526 where the processing module identifies a plurality of data segments for retrieval where the data object was divided into the plurality of data objects. For example, the processing module accesses at least one of a DSN directory and a dispersed hierarchical index to determine the number of data segments.

For each data segment, the method continues at step 528 where the processing module assigns a storage vault for retrieval to produce assignment information. The sending me be based on one or more of a retrieval performance goal, a slice retrieval performance levels, and the number of storage vaults for the retrieval.

The method continues at step 530 where the processing module facilitates recovery of each data segment of the plurality of data segments from the selected two or more storage vaults. For example, the processing module sends read slice requests for data segments assigned to each of the selected two or more storage vaults, receives read slice responses, dispersed storage error decodes received encoded data slices to reproduce a plurality of data segments, and aggregates the reproduced plurality of data segments to produce recovered data.

FIG. 15A is a schematic block diagram of another dispersed storage network (DSN) that includes a plurality of storage vaults, the network 24 of FIG. 1, and the distributed storage and task (DST) processing unit 16 of FIG. 1. The DST processing unit 16 includes the memory 88 of FIG. 3. The plurality of storage vaults may be implemented utilizing one or more sets of DST execution (EX) units. Each set of DST execution units may include any number of DST execution units. For example, vault 1 is implemented to include a first set of DST execution units 1-1 through 1-n, vault 2 is implemented to include a second set of DST execution units 2-1 through 2-n, etc. through vault V that is implemented to include a "Vth" set of DST execution units V–1 through V-n. Each DST execution unit may be implemented utilizing the DST execution unit 36 of FIG. 1.

The DSN functions to process data access requests 536 in accordance with configuration information. The configuration information includes a plurality of configuration elements. For example, the configuration elements may include one or more of vault identifiers (IDs) 540, information dispersal algorithm (IDA) parameters 542, access controls 544, index information 546, usage levels 548, delete controls 550, versioning information 552, and synchronization information 554. The vault IDs 540 includes identifiers of each of the plurality of storage vaults and identifiers of DST execution units associated with the storage vaults. The IDA parameters 542 includes, for each storage vault, IDA parameters including one or more of an IDA width, decode threshold number, and an encoding matrix. The access controls 544 includes positive or negative access controls for individuals and/or groups of individuals and/or vaults for the plurality of storage vaults for individual access types including reading, writing, deleting, and listing. The index information 546 includes an address of a dispersed hierarchical index associated with the vaults. The usage levels 548 includes one or more of a maximum allowable amount of storage per storage vault and a maximum allowable amount storage per user. The delete controls 550 includes identifiers of requesting entities allowed to delete data objects from one or more of the storage vaults. The versioning information 552 includes an indicator to indicate whether versioning is activated where multiple versions are maintained or when versioning is deactivated when only one version is maintained. The synchronization information 554 includes parameters for frequency of synchronization checks and a maximum allowable duration for a synchronization cycle.

In an example of operation of the processing of the data access request 536, the DST processing unit 16 receives the data access request 536 from a requesting entity with regards to a data object. The data access request 536 includes at least one of a read request, a write request, a delete request, a list request, a data identifier (ID) and an identifier of the requesting entity.

Having received the data access request 536, the DST processing unit 16 identifies a vault set based on the data access request, where the vault set includes one or more storage vaults affiliated with a common configuration information. The identifying includes at least one of accessing a DSN directory and accessing a dispersed hierarchical index to extract an identifier of the vault set based on the identifier of the requesting entity and the data ID.

Having identified the vault set, the DST processing unit 16 recovers the configuration information associated with the vault set. As a specific example, the DST processing unit 16 retrieves the configuration information from the memory 88. As another specific example, the DST processing unit 16 recovers the configuration information from at least one storage vault (e.g., retrieving encoded data slices, decoding retrieved encoded data slices to reproduce the configuration information). Having recovered the configuration information, the DST processing unit 16 determines whether to process the data access request based on the recovered configuration information. The determining may include verifying authorization for data access, determining whether a usage level has been violated (e.g., too much data has been stored), and determining whether deletion of data is authorized when receiving a delete request.

When processing the data access request 536, the DST processing unit 16 processes the data access request 536 in accordance with the configuration information. For example, the DST processing unit 16 accesses one or more storage vaults in accordance with the vault identifiers and IDA parameters of the configuration information associated with the vault ID. As another example, the DST processing unit 16 accesses a list of vaults, receives access responses from one or more storage vaults, and issues a data access response 538 based on received data access responses.

FIG. 15B is a flowchart illustrating an example of processing data access requests. The method includes step 560 where a processing module (e.g., of a distributed storage and task (DST) processing unit) receives a data access requests with regards to a data object. The receiving includes one or more of identifying a requesting entity, identifying a data access request type, and identifying the data object.

The method continues at step 562 where the processing module identifies a vault set based on the data access request. A plurality of storage vaults includes the vault set. The identifying includes utilizing one or more of a requesting entity identifier, a data access type, a data identifier, to access at least one of a DSN directory, a system registry information, and a dispersed hierarchical index to extract an identifier of the vault set.

The method continues at step 564 where the processing module obtains configuration information associated with the vault set. As a specific example, the processing module retrieves the configuration information from a local memory based on the identifier of the vault set. As another example, the processing module recovers the configuration information from at least one storage vault of the plurality of storage vaults.

The method continues at step 566 where the processing module determines whether to process the data access request based on the obtained configuration information associated with the vault set. For example, the processing module performs an authentication of the data access request utilizing the configuration information to produce an authorization request.

When processing the data access request, the method continues at step 568 where the processing module processes the data access request in accordance with the obtained configuration information associated with the vault set. For example, the processing module accesses one or more of the storage vaults in accordance with the data access request and the obtained configuration information, receives one or more access responses, and issues a data access response to a requesting entity in response to the data access request in accordance with the obtained configuration information.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices of a storage network, the method comprises:
   obtaining a data object for storage from a user;
   identifying a plurality of virtual storage vaults for storage of the data object, wherein each virtual storage vault of the plurality of virtual storage vaults is associated with a plurality of dispersed storage units, wherein a virtual storage vault is a virtual memory block within a storage network memory module;
   determining dispersal error encoding parameters associated with each virtual storage vault of the plurality of virtual storage vaults;
   dispersed error encoding the data object in accordance with dispersal error encoding parameters associated with each virtual storage vault of the plurality of virtual storage vaults to produce a corresponding plurality of sets of encoded data slices (EDSs), wherein the data object is segmented into a first plurality of data segments and further wherein each set of EDSs of the plurality of sets of EDSs corresponds to a respective a data segment of a plurality of data segments;
   issuing one or more sets of write slice requests to each virtual storage vault of the plurality of virtual storage vaults, wherein the one or more sets of write slice requests include the corresponding plurality of sets of EDSs;
   receiving EDS information from at least some of the plurality of virtual storage vaults;
   interpreting the received EDS information from at least some of the plurality of virtual storage vaults to determine a number of virtual storage vaults that have successfully stored the corresponding plurality of sets of EDSs, wherein successfully storing the corresponding plurality of sets of EDSs includes storing a decode threshold number of EDSs for each set of the plurality of sets of EDSs;

when a predetermined number of virtual storage vaults of the plurality of virtual storage vaults have successfully stored the corresponding plurality of sets of EDS within a synchronization timeframe, issuing a favorable response to the user; and when a predetermined number of virtual storage vaults of the plurality of virtual storage vaults have not successfully stored the corresponding plurality of sets of EDS within the synchronization timeframe, initiating a retry process to store the corresponding plurality of sets of encoded data slices in one or more virtual storage vaults associated with unsuccessful storage.

2. The method of claim 1, wherein the obtaining the data object for storage from a user further includes receiving the data object from the user.

3. The method of claim 1, wherein the obtaining the data object for storage from a user further includes generating the data object.

4. The method of claim 1, wherein the obtaining the data object for storage from a user further includes retrieving the data object from the DSN.

5. The method of claim 1, wherein the identifying the plurality of virtual storage vaults for storage of the data object includes interpreting a request from the user.

6. The method of claim 1, wherein the identifying the plurality of virtual storage vaults for storage of the data object includes interpreting information from a system registry.

7. The method of claim 1, wherein the issuing a favorable response to the user includes providing an indication of storage and synchronization success.

8. The method of claim 7, wherein the providing an indication of successful storage and synchronization includes providing information sufficient to determine a number of storage vaults wherein EDS were successfully stored.

9. The method of claim 7, wherein the providing an indication of successful storage and synchronization includes providing information sufficient to determine a number of storage vaults of unknown storage status.

10. A computing device comprises:
an interface for interfacing with a network;
memory; and
a processing module operably coupled to the interface and to the memory, wherein the processing module is operable to:
obtain a data object for storage from a user;
identify a plurality of virtual storage vaults for storage of the data object, wherein each virtual storage vault of the plurality of virtual storage vaults is a virtual memory block within a storage network memory module;
determine dispersal error encoding parameters associated with each virtual storage vault of the plurality of virtual storage vaults;
dispersed error encode the data object in accordance with dispersal error encoding parameters associated with each virtual storage vault of the plurality of virtual storage vaults to produce a corresponding plurality of sets of encoded data slices (EDSs), wherein the data object is segmented into a first plurality of data segments and further wherein each set of EDSs of the plurality of sets of EDSs corresponds to a respective a data segment of a plurality of data segments;

issue one or more sets of write slice requests to each virtual storage vault of the plurality of virtual storage vaults, wherein the one or more sets of write slice requests include the corresponding plurality of sets of EDSs;

receive EDS information from at least some of the plurality of virtual storage vaults;

interpret the received EDS information from at least some of the plurality of virtual storage vaults to determine a number of virtual storage vaults that have successfully stored the corresponding plurality of sets of EDSs, wherein the corresponding plurality of sets of EDSs have been successfully stored when each set of the plurality of sets of EDSs includes a decode threshold number of EDSs;

when a threshold number of virtual storage vaults of the plurality of virtual storage vaults have successfully stored the corresponding plurality of sets of EDSs within a synchronization timeframe, issue a favorable response to the user; and when a threshold number of virtual storage vaults of the plurality of virtual storage vaults have not successfully stored the corresponding plurality of sets of EDSs within the synchronization timeframe, initiate a retry process to store the corresponding plurality of sets of EDSs in one or more virtual storage vaults associated with unsuccessful storage.

11. The computing device of claim 10, wherein the data object for storage was created by the user.

12. The computing device of claim 10, wherein the processing module is further operable to generate the data object.

13. The computing device of claim 10, wherein the processing module is further operable to retrieve the data object from the network.

14. The computing device of claim 10, wherein the processing module is further operable to interpret a user request to identify the plurality of virtual storage vaults for storage of the data object.

15. The computing device of claim 10, wherein the processing module is further operable to interpret information from a system registry to identify the plurality of virtual storage vaults for storage of the data object.

16. The computing device of claim 10, wherein the processing module is further operable to provide an indication of storage and synchronization success.

17. The computing device of claim 16, wherein the indication of success of storage and synchronization includes information sufficient to determine the number of virtual storage vaults wherein EDSs were successfully stored.

18. The computing device of claim 16, wherein the indication of success of storage and synchronization includes information sufficient to determine the number of virtual storage vaults with an unknown storage status.

19. A dispersed storage (DS) module comprises:
a first module, when operable within a computing device, causes the computing device to:
obtain a data object for storage from a user;
a second module, when operable within the computing device, causes the computing device to:
identify a plurality of virtual storage vaults for storage of the data object wherein each virtual storage vault of the plurality of virtual storage vaults is associated with a plurality of dispersed storage units, wherein each virtual storage vault of the plurality of virtual storage vaults is a virtual memory block within a storage network memory module;

a third module, when operable within the computing device, causes the computing device to:
  determine dispersal error encoding parameters associated with each virtual storage vault of the plurality of virtual storage vaults; and
  dispersed error encode the data object in accordance with dispersed error encoding parameters associated with a first virtual storage vault of the plurality of virtual storage vaults to produce a corresponding plurality of sets of encoded data slices (EDSs), wherein the data object is segmented into a first plurality of data segments and further wherein each set of EDSs of the plurality of sets of EDSs corresponds to a respective a data segment of a plurality of data segments;

a fourth module, when operable within the computing device, causes the computing device to:
  issue one or more sets of write slice requests to each virtual storage vault of the plurality of virtual storage vaults, wherein the one or more sets of write slice requests include the corresponding plurality of sets of EDSs;
  receive EDS information from at least some of the plurality of virtual storage vaults;

a fifth module, when operable within the computing device, causes the computing device to:
  interpret the received EDS information from at least some of the plurality of virtual storage vaults to determine a number of virtual storage vaults that have successfully stored the corresponding plurality of sets of EDSs, wherein the corresponding plurality of sets of EDSs have been successfully stored when each set of the plurality of sets of EDSs includes a decode threshold number of EDSs;
  when a threshold number of virtual storage vaults of the plurality of virtual storage vaults have successfully stored the corresponding plurality of sets of EDSs within a synchronization timeframe, issue a favorable response to the user; and
  when a threshold number of virtual storage vaults of the plurality of virtual storage vaults have not successfully stored the corresponding plurality of sets of EDSs within the synchronization timeframe, initiate a retry process to store the corresponding plurality of sets of encoded data slices in one or more virtual storage vaults associated with unsuccessful storage.

20. The DS module of claim 19, wherein the first module, when operable within the computing device, causes the computing device to:
  obtain the data object for storage from a user based on at least one of the DS module having received the data object from the user, the DS module having generated the data object, and the DS module having retrieved the data object.

* * * * *